US012403343B2

(12) United States Patent
Prat et al.

(10) Patent No.: US 12,403,343 B2
(45) Date of Patent: Sep. 2, 2025

(54) SENSOR UNITS FOR USE WITH FIRE SUPPRESSION SYSTEMS

(71) Applicant: Tyco Fire Products LP, Lansdale, PA (US)

(72) Inventors: Jordi Abad Prat, Matadepera (ES); Carlos Perez Perez, Sant Feliu de Llobregat (ES)

(73) Assignee: Tyco Fire Products LP, Cranston, RI (US)

( * ) Notice: Subject to any disclaimer, the term of this patent is extended or adjusted under 35 U.S.C. 154(b) by 667 days.

(21) Appl. No.: 17/614,659

(22) PCT Filed: May 31, 2019

(86) PCT No.: PCT/IB2019/054546
§ 371 (c)(1),
(2) Date: Nov. 29, 2021

(87) PCT Pub. No.: WO2020/240267
PCT Pub. Date: Dec. 3, 2020

(65) Prior Publication Data
US 2022/0219031 A1 Jul. 14, 2022

(51) Int. Cl.
*A62C 35/13* (2006.01)
*A62C 37/50* (2006.01)
(Continued)

(52) U.S. Cl.
CPC .............. *A62C 35/13* (2013.01); *A62C 37/50* (2013.01); *F17C 13/025* (2013.01); *G01L 13/00* (2013.01);
(Continued)

(58) Field of Classification Search
CPC ....... A62C 35/13; A62C 37/50; F17C 13/025; G01L 13/00; G06F 3/00; G06F 3/048; G08B 21/12; G08B 21/182; G08B 29/00
See application file for complete search history.

(56) References Cited

U.S. PATENT DOCUMENTS

2004/0113813 A1* 6/2004 Henson ................ G01L 7/043
340/870.07
2006/0288867 A1* 12/2006 Herb ................... B01D 53/047
95/96

(Continued)

FOREIGN PATENT DOCUMENTS

CN 109568843 A 4/2019

OTHER PUBLICATIONS

International Search Report & Written Opinion Received for International App. No. PCT/IB2019/054546, dated Jun. 25, 2020, 19 pages.

*Primary Examiner* — Ryan W Sherwin
(74) *Attorney, Agent, or Firm* — Foley & Lardner LLP

(57) ABSTRACT

A sensor unit for a fire suppression system includes a sensor module, a display module, a controller, and an antenna. The sensor module includes a first housing including a fitting configured to be coupled to a tank containing a fluid, a pressure sensor located within the first housing and configured to sense a pressure of a fluid and provide pressure data related to the pressure of the fluid, and a temperature sensor located within the first housing and configured to sense a temperature and provide temperature data related to the temperature of the fluid. The display module includes a second housing selectively attached to the first housing such that the display module is selectively removable from the display module, and a user interface. The controller is operatively coupled to the pressure and temperature sensors.

(Continued)

The antenna is configured to transfer the pressure data and the temperature data to a network.

20 Claims, 15 Drawing Sheets

(51) Int. Cl.
  *F17C 13/02* (2006.01)
  *G01L 13/00* (2006.01)
  *G06F 3/00* (2006.01)
  *G06F 3/048* (2013.01)
  *G08B 21/12* (2006.01)
  *G08B 21/18* (2006.01)
  *G08B 29/00* (2006.01)

(52) U.S. Cl.
  CPC ............... *G06F 3/00* (2013.01); *G06F 3/048* (2013.01); *G08B 21/12* (2013.01); *G08B 21/182* (2013.01); *G08B 29/00* (2013.01)

(56) References Cited

U.S. PATENT DOCUMENTS

| | | | |
|---|---|---|---|
| 2009/0301739 A1 | 12/2009 | Rother et al. | |
| 2012/0188076 A1* | 7/2012 | McSheffrey | F17C 13/02 340/539.17 |
| 2013/0306650 A1* | 11/2013 | Downie | G01G 17/04 137/551 |
| 2015/0290482 A1* | 10/2015 | Rousseau | A62C 37/50 340/577 |
| 2017/0023434 A1* | 1/2017 | Jerez | G01M 3/2815 |
| 2017/0328799 A1 | 11/2017 | Stilwell et al. | |
| 2018/0067011 A1* | 3/2018 | Yung | H04W 4/38 |
| 2018/0087688 A1* | 3/2018 | Frenal | F17C 13/04 |
| 2018/0133529 A1* | 5/2018 | Kjellman | A62C 37/50 |
| 2019/0003649 A1* | 1/2019 | Lambert | F17C 13/025 |
| 2019/0209022 A1* | 7/2019 | Sobol | H04W 4/80 |
| 2019/0242528 A1* | 8/2019 | Frenal | F17C 13/04 |

* cited by examiner

SENSOR UNITS FOR USE WITH FIRE SUPPRESSION SYSTEMS

BACKGROUND

The present disclosure relates generally to fire suppression systems. More specifically, the present disclosure relates to systems for monitoring fire suppression systems.

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppression agent throughout the area. The fire suppressant agent then extinguishes or controls the fire.

SUMMARY

At least one embodiment relates to a sensor unit for a fire suppression system. The sensor unit includes a sensor module, a display module, a controller, and an antenna. The sensor module includes a first housing including a fitting configured to be coupled to a tank containing a fluid, a pressure sensor located within the first housing and configured to sense a pressure of a fluid and provide pressure data related to the pressure of the fluid, and a temperature sensor located within the first housing and configured to sense a temperature and provide temperature data related to the temperature of the fluid. The display module includes a second housing selectively attached to the first housing such that the display module is selectively removable from the display module and a user interface configured to display the pressure data to a user. The controller is operatively coupled to the pressure sensor and the temperature sensor. The antenna is operatively coupled to the controller and configured to transfer the pressure data and the temperature data to a network.

Another embodiment relates to a fire suppression system including multiple storage tanks, each storage tank configured to store a pressurized fluid, and multiple sensor units, each sensor unit coupled to one of the storage tanks; and a cloud-based computing system. Each sensor unit includes a pressure sensor configured to sense pressure and provide pressure data related to a pressure of the pressurized fluid, a temperature sensor configured to sense temperature and provide temperature data related to a temperature of the pressurized fluid, and an antenna configured to transfer the pressure data and the temperature data. The cloud-based computing system is configured to receive the transferred pressure data and the temperature data from the sensor units. The cloud-based computing system is programmed to store the transferred pressure data and temperature data, calculate a normalized pressure for each of the storage tanks based on the pressure data and temperature data for that storage tank, determine if the normalized pressure for each of the storage tanks indicates fluid leakage from that storage tank, and generate a notification of a leak in one of the plurality of storage tanks when the determination indicates fluid leakage from that storage tank.

Another embodiment relates to a sensor unit for a fire suppression system. The sensor unit includes a housing configured to be coupled to a tank containing a fluid, a pressure sensor coupled to the housing and configured to sense a pressure of the fluid and provide pressure data related to the pressure of the fluid, a display coupled to the housing and configured to display the pressure data to a user, an input device coupled to the housing and configured to receive an input from the user, an antenna coupled to the housing and configured to wirelessly transfer the pressure data, a battery coupled to the housing and configured to provide electrical energy, and a controller operatively coupled to the pressure sensor. In a sleep mode, the controller is configured to disable the pressure sensor, the antenna, and the display such that the pressure data is not sensed by the pressure sensor, transferred by the antenna, or displayed by the display. In a wake mode, the controller is configured to at least one of (a) control the pressure sensor to sense the pressure of the fluid, (b) transfer the pressure data using the antenna, and (c) control the display to display the pressure data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
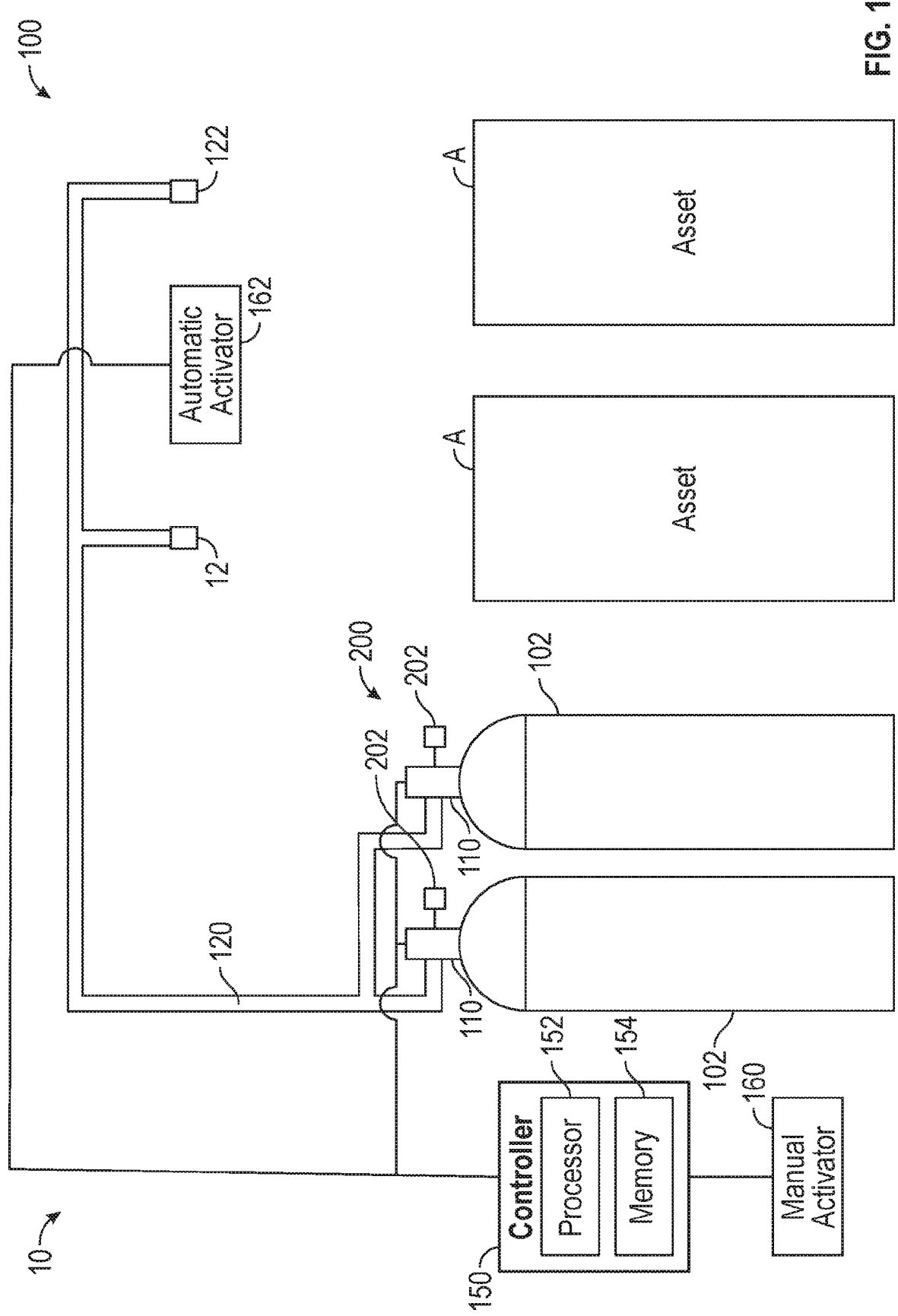
FIG. 1 is a schematic of a fire suppression system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Water is commonly used in fire suppression systems that suppress fires in different types of areas (e.g., office buildings, homes, schools, etc.). Water is effective at extinguishing fires fueled by common flammable materials such as wood, paper, and cloth. However, in certain scenarios, water is undesirable for use as a fire suppressant agent. When extinguishing fires near certain types of objects, such as books or electronic components, exposure to water can damage the objects that the fire suppression system is designed to protect. Accordingly, in certain environments, such as power plants, telecommunications facilities, aircraft, transport, data centers, medical facilities, and museums, application-specific chemicals are used to suppress fires instead of and/or in addition to water. These chemicals may be configured to suppress or control fires without causing damage to sensitive objects or requiring extensive clean-up.

Chemical fire suppression systems can include a pressure vessel or tank containing a pressurized fire suppressant agent, such as an inert gas (e.g., nitrogen, argon), a halocarbon, or carbon dioxide. A valve or actuator controls the flow of agent from the tank. When the actuator is activated, the agent expands outside of the tank, travelling along a length of pipe to one or more nozzles. The nozzles disperse the agent into the surrounding area (e.g., into a room or space). The agent reduces the concentration of oxygen in the room and/or reduces the heat of any items that are burning, extinguishing the fire.

Fire suppression systems are commonly left in an unused, standby state for long periods of time, but are required to be available for use at all times. Accordingly, even a small leak in a tank of a fire suppression system can permit a large portion of the agent to escape the tank over time. If too much agent leaks from the tank, then the fire suppression system may no longer have the capability to effectively suppress a fire. As such, repeated monitoring of the pressure within the tank is required to sense leakage from the tank.

To accomplish this monitoring, some tanks of fire suppressant agent are outfitted with switched pressure gauges. These gauges visually indicate the pressure within the tank. Additionally, the gauges include an electrical switch that activates when the measured pressure decreases below a predetermined threshold pressure. In some systems, this activation takes the form of changing from a closed circuit to an open circuit. The switch may be electrically coupled to a monitoring circuit such that an alarm is activated when the switch creates an open circuit. In systems that include multiple tanks, each tank may be outfitted with a switched pressure gauge, and the switches may all be organized in series such that the activation of any one of the switches causes the whole system to register as an open circuit, activating the alarm. However, these monitoring systems can only sense when the pressure within a tank decreases below a predetermined pressure. If a tank is subjected to a changing temperature (e.g., if the tank is located within a room that is poorly insulated), then the pressure within the tank can fluctuate greatly without the amount of agent in the tank changing. Accordingly, the switched pressure gauges have no way of differentiating between an alarm activation caused by a leak and an alarm activation caused by a decrease in ambient temperature. Switched pressure gauges may also fail to identify a leak due to an increase in pressure caused by an increase in ambient temperature.

Fire Suppression System

Referring to FIG. 1, a room, building, enclosure, volume, or area, shown as space 10, is outfitted with a fire suppression system 100, according to an exemplary embodiment. In one embodiment, the fire suppression system 100 is a chemical fire suppression system. The fire suppression system 100 is configured to dispense or distribute a fire suppressant agent onto and/or around a fire within the space 10, controlling or suppressing the fire. The fire suppression system 100 can be used alone or in combination with other types of fire suppression systems (e.g., a building sprinkler system, a portable fire extinguisher, etc.). In some embodiments, multiple fire suppression systems 100 are used in combination with one another to cover a larger area (e.g., each in different rooms of a building, multiple spaces 10, etc.).

In some embodiments, the fire suppression system 100 is a clean agent system that is configured to suppress fires within the space 10 while limiting damage to nearby assets. The fire suppression system 100 may utilize a clean agent, such as an inert gas (e.g., nitrogen, argon, etc.), a halocarbon agent, or carbon dioxide. Such clean agents may be stored as a superpressurized liquid configured to vaporize upon discharge, absorbing heat from the fire and/or from items that are fueling the fire to suppress or control the fire. By way of example, to bring the agent to a superpressurized state, the agent may be pressurized to the point of condensation into a liquid, and additional gas that condensates at a higher pressure may be added to further pressurize the agent. After absorbing heat, the agent may evaporate. Alternatively, the clean agents may be stored as a gas. The agent may reduce the concentration of oxygen within the space, extinguishing the fire. Both liquid and gaseous clean agents may suppress fires without leaving a residue that requires cleanup. The agents may also be electrically non-conductive. These properties make clean agents useful in certain applications where delicate and/or valuable items or information are stored. By way of example, the fire suppression system 100 may be used to protect telecommunication sites, data centers, archives, museums, oil and gas facilities, power plants, or other areas. In other embodiments, the fire suppression system 100 utilizes other types of agents.

Referring again to FIG. 1, the fire suppression system 100 includes a pair of fire suppressant tanks 102 (e.g., vessels, containers, vats, drums, tanks, canisters, cartridges, or cans, etc.). The fire suppressant tanks 102 each contain a pressurized fire suppressant agent. Each fire suppressant tank 102 is coupled to a valve, puncture device, or activator assembly, shown as actuator 110. The actuators 110 are configured to selectively fluidly couple an internal volume of each fire suppressant tank 102 to a conduit (e.g., a hose, a pipe, a tube, etc.), shown as pipe 120. The pipe 120 may be an assembly including one or more straight or bent sections of conduit and/or one or more fittings. The pipe 120 conveys the agent to one or more outlets, shown as nozzles 122. The nozzles 122 generate a spray of agent (e.g., vaporized agent) that addresses one or more fires affecting one or more assets A (e.g., walls, spaces, furniture, vehicles, servers, museum pieces, etc.). The nozzles 122 may direct the agent directly toward the assets A and/or the nozzles 122 may direct the agent around the assets A (e.g., to surround the assets A).

As shown in FIG. 1, the actuators 110 are operatively coupled to a controller 150. In response to an indication that a fire has been detected, the controller 150 is configured to activate the actuators 110, releasing the pressurized agent into the pipe 120. The controller 150 includes a processing circuit or processor 152. The processor 152 is in communication with a memory device or memory 154.

The controller 150 is operatively coupled to one or more first activators, sensors, or user interfaces, shown as manual activator 160. The manual activator 160 may include a pull station, lever, button, knob, switch, touch screen, or any other type of user interface device that facilitates interaction by a user. The manual activator 160 may be marked to indicate that a user should interact with the manual activator 160 (e.g., push a button, pull a pull station, etc.) in the event of a fire. In response to such an interaction, the manual activator 160 sends a fire detection signal to the controller 150 indicating that a fire has been detected within the space 10.

The controller 150 is operatively coupled to one or more second activators, sensors, or fire detection devices, shown as automatic activator 162. The automatic activator 162 may include temperature or heat sensors (e.g., thermocouples, linear detection wire, etc.), smoke detectors, optical sensors (e.g., cameras, infrared sensors, etc.), or other types of sensors configured to detect the presence of a fire or a sign of a fire within the space 10. In response to detecting a fire within the space, the automatic activator 162 sends a fire detection signal to the controller 150.

In response to receiving a detection signal, the controller 150 is configured to send an activation signal to the actuators 110. In some embodiments, the activation signal is an electrical signal. In other embodiments, the activation signal is or causes a flow of pressurized fluid or a movement of a mechanical member (e.g., a cable, a lever, etc.). The controller 150 may send the activation signal to all of the actuators 110. Alternatively, activation of one actuator 110 by the controller 150 may automatically trigger activation of the other actuators 110. In response to receiving the activation signal, the actuators 110 activate, fluidly coupling the corresponding fire suppressant tank 102 to the pipe 120. The pressurized fire suppressant agent is then forced through the pipe 120 to the nozzles 122, where the agent is distributed about the assets A to suppress the detected fires. The fire suppression system 100 may supply fire suppressant agent through all of the nozzles 122 simultaneously. Alternatively, the fire suppression system 100 may supply fire suppressant agent through only a certain subset of the nozzles 122.

Referring still to FIG. 1, the fire suppression system 100 further includes a leakage detection system, shown as monitoring system 200. The monitoring system 200 includes a series of pressure monitoring assemblies, temperature monitoring assemblies, leakage detection assemblies, or sensor units (e.g., monitors, assemblies, etc.), shown as electronic gauges 202. The electronic gauges 202 are fluidly coupled to the tanks 102 (e.g., directly, through the actuator 110, etc.). Specifically, each tank 102 has an associated electronic gauge 202. The electronic gauges 202 are configured to sense (e.g., detect, measure directly, measure a quantity related to, etc.) the pressure of the agent within the corresponding tank 102. The electronic gauges 202 are also configured to sense (e.g., detect, measure directly, measure a quantity related to, etc.) a temperature of the agent within the tank 102, a temperature of the ambient air surrounding the tank 102, and/or a temperature of the tank 102 or a component coupled to the tank 102 (e.g., the actuator 110). Using the sensed temperature, the electronic gauge 202 is configured to generate a normalized pressure that accounts for changes in pressure due to variations in temperature. The normalized pressure is used to determine if the tank 102 is leaking or has leaked.

Although the monitoring system 200 has been described as monitoring the temperature and pressure of a gas within a clean agent system, in other embodiments, the monitoring system 200 may be used with any element of any type of fire suppression system where it is desirable to monitor, analyze, report, or otherwise utilize the temperature and/or pressure of a fluid within a vessel. The monitoring system 200 may be used to monitor the temperature and/or pressure of any fluid (e.g., any liquid or gas). Additionally or alternatively, the monitoring system 200 may be configured to monitor another quantity or condition that can be used to determine if the tank 102 is leaking (e.g., the conductivity of the fluid within the tank 102). The fire suppression system 100 may be a restaurant fire suppression system, a vehicle fire suppression system, a portable fire suppression system, a foam fire suppression system, or any other type of fire suppression system. The tank 102 may be a gas cartridge (e.g., an expellant gas cartridge), an agent tank, a canister of a portable (e.g., handheld) fire extinguisher, or any other type of vessel.

Electronic Gauges

Referring to FIGS. 2-6, a sensor unit, shown as electronic gauge 202 is shown according to an exemplary embodiment. The electronic gauge 202 includes a first portion or subassembly (e.g., a sensing assembly, a measurement assembly, a sensor module, etc.), shown as sensor unit 204, and a second portion or subassembly (e.g., a display assembly, an interface assembly, a communication assembly, a calculation assembly, a computation assembly, a display module, etc.), shown as display unit 206. The sensor unit 204 includes sensing components configured to sense (e.g., measure, detect, etc.) a temperature and pressure of gas within the tank 102. The display unit 206 is configured to receive temperature and pressure data from the sensor unit 204. The display unit 206 is configured to perform calculations and execute control logic using the temperature and pressure data, receive inputs (e.g., commands, etc.) from a user, and/or provide information (e.g., directly to a user through a display, to another device).

Figure 7:
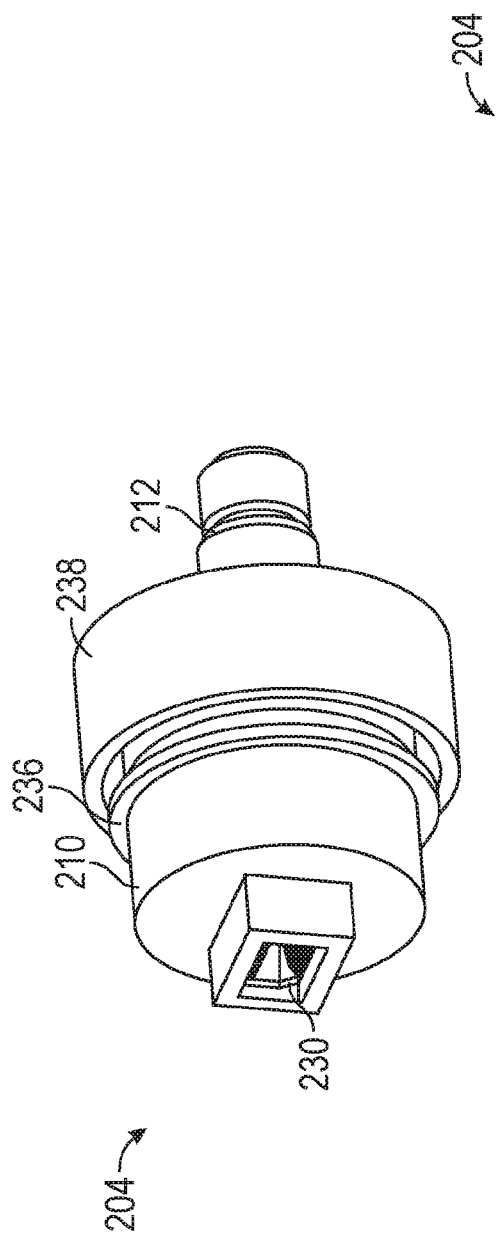
FIG. 7 is a perspective view of a sensor module of the sensor unit of FIG. 3.
Figure 8:
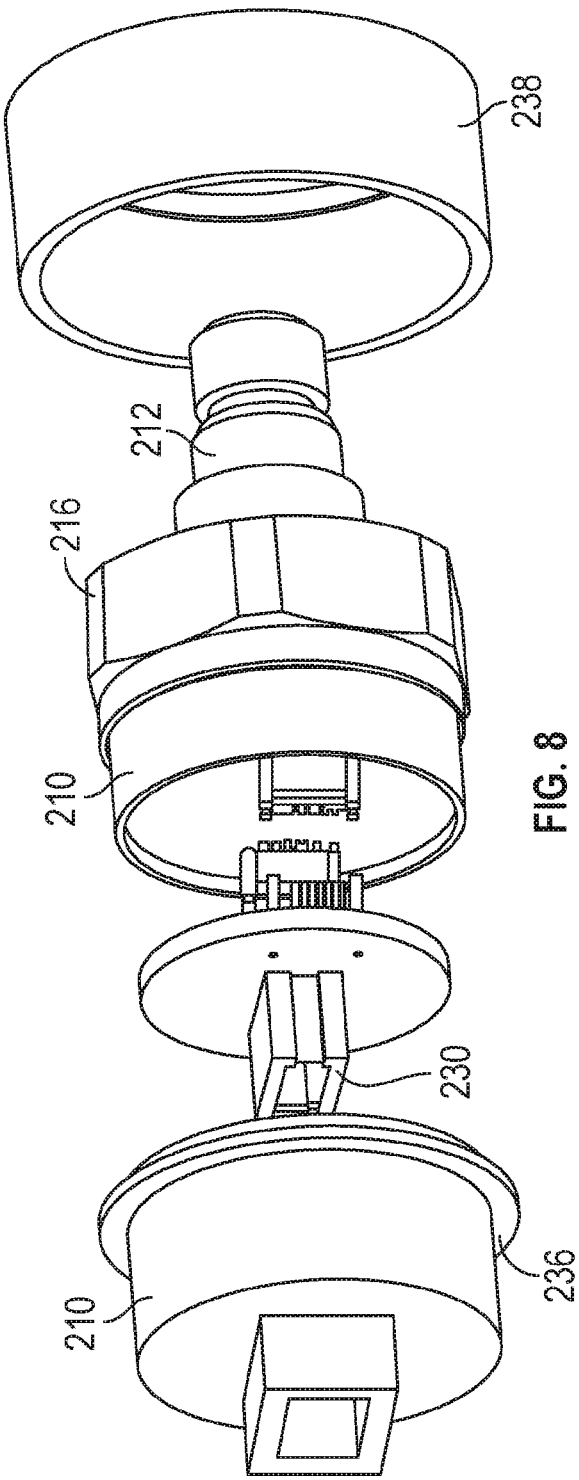
FIG. 8 is an exploded view of the sensor module of FIG. 7.

As shown in FIGS. 7 and 8, the sensor unit 204 includes a housing 210. The housing 210 defines an internal volume configured to contain (e.g., completely, partially, etc.) the various components of the sensor unit 204. In some embodiments, the housing 210 is made from multiple sections that are coupled (e.g., fixedly coupled, welded, adhered, etc.) to one another. In some embodiments, the housing 210 is substantially sealed.

Figure 4:
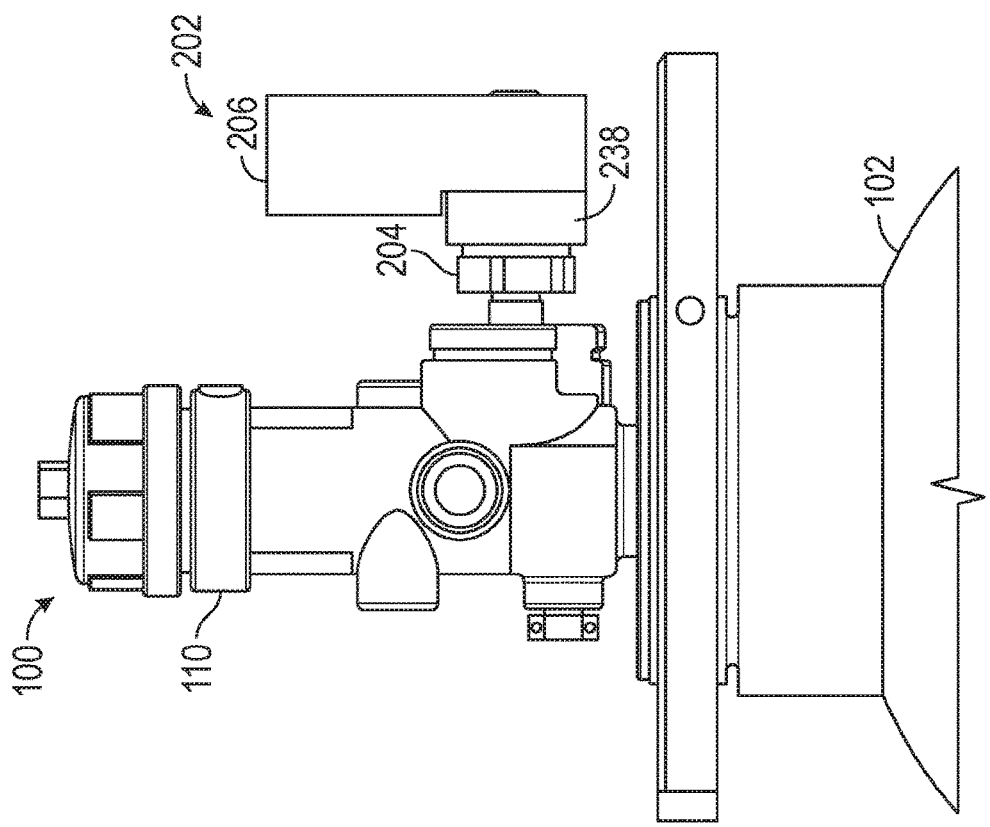
FIG. 4 is a side view of the tank, the actuator, and the sensor unit of FIG. 3.
Figure 3:
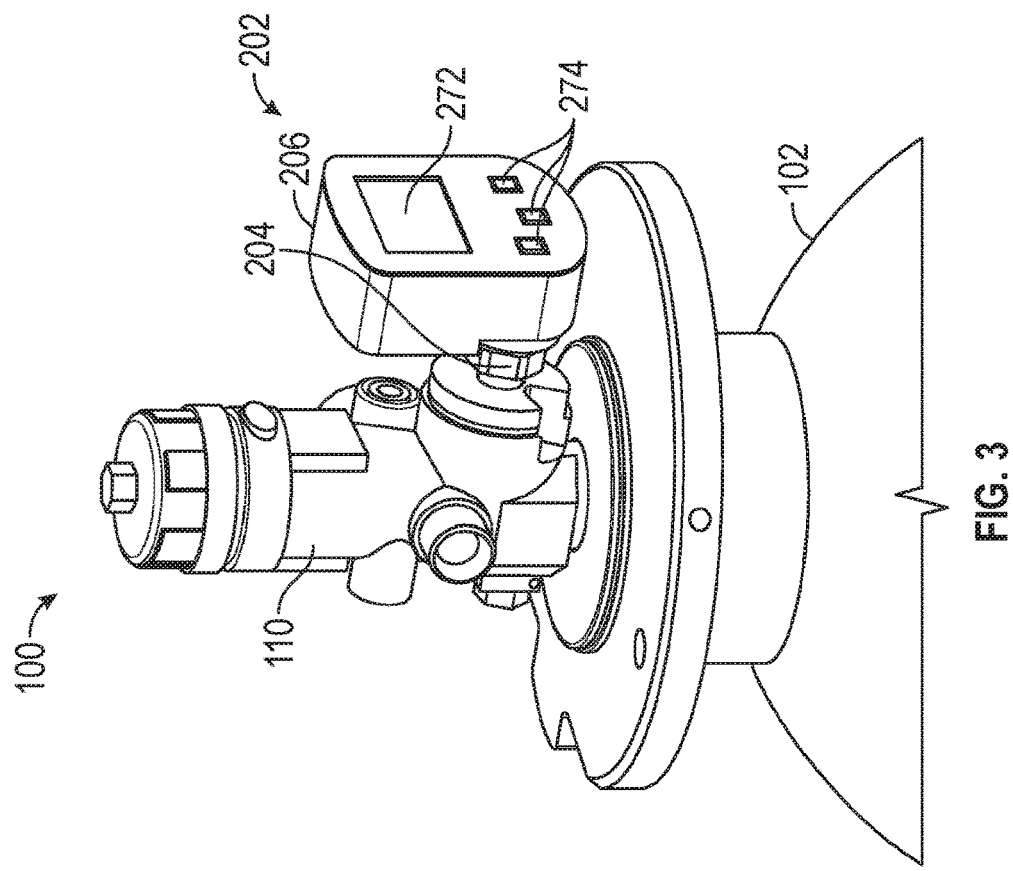
FIG. 3 is a perspective view of a tank, an actuator, and a sensor unit of the fire suppression system of FIG. 1.
Figure 5:
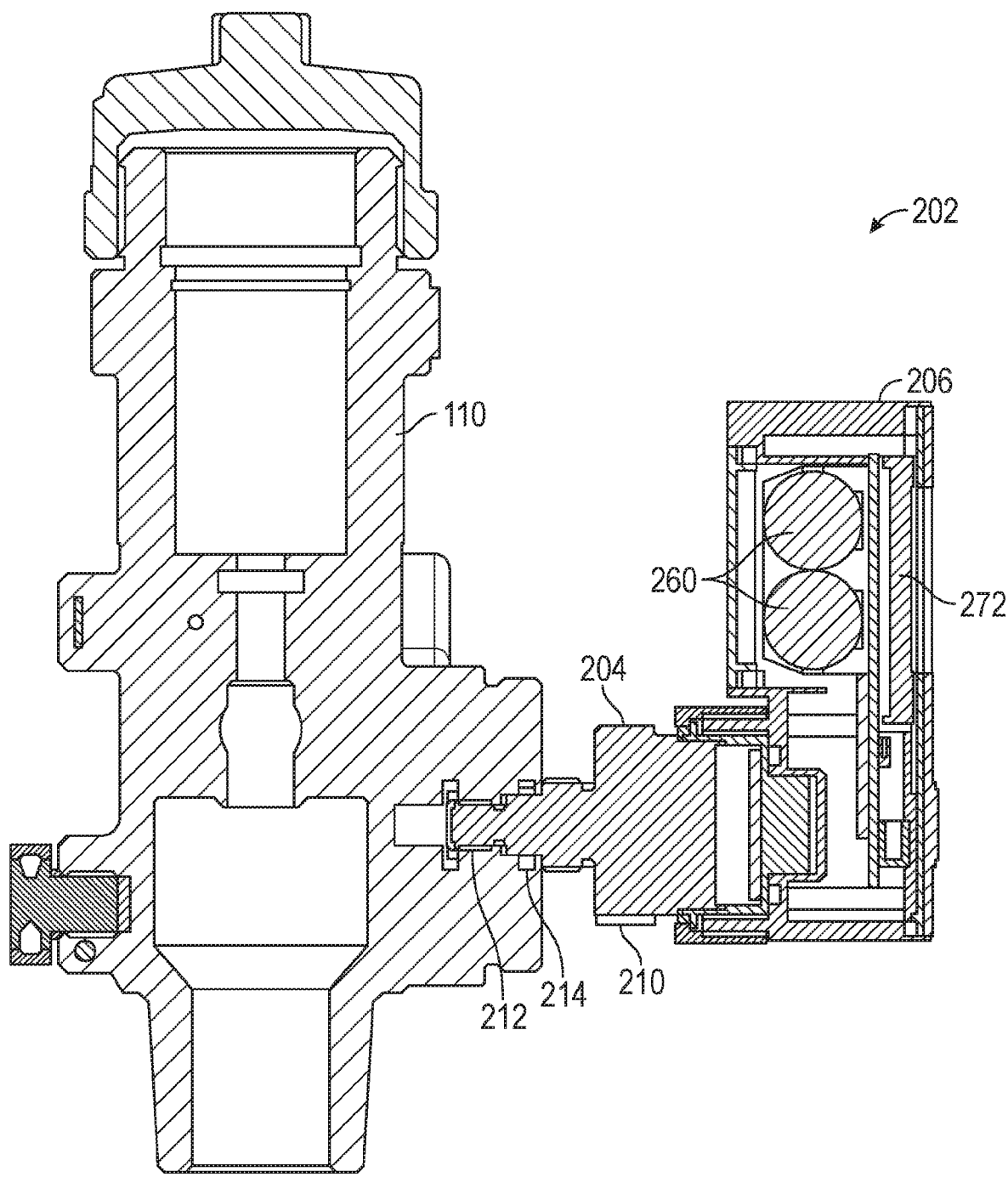
FIG. 5 is a side section view of the actuator and the sensor unit of FIG. 3.
Figure 10:
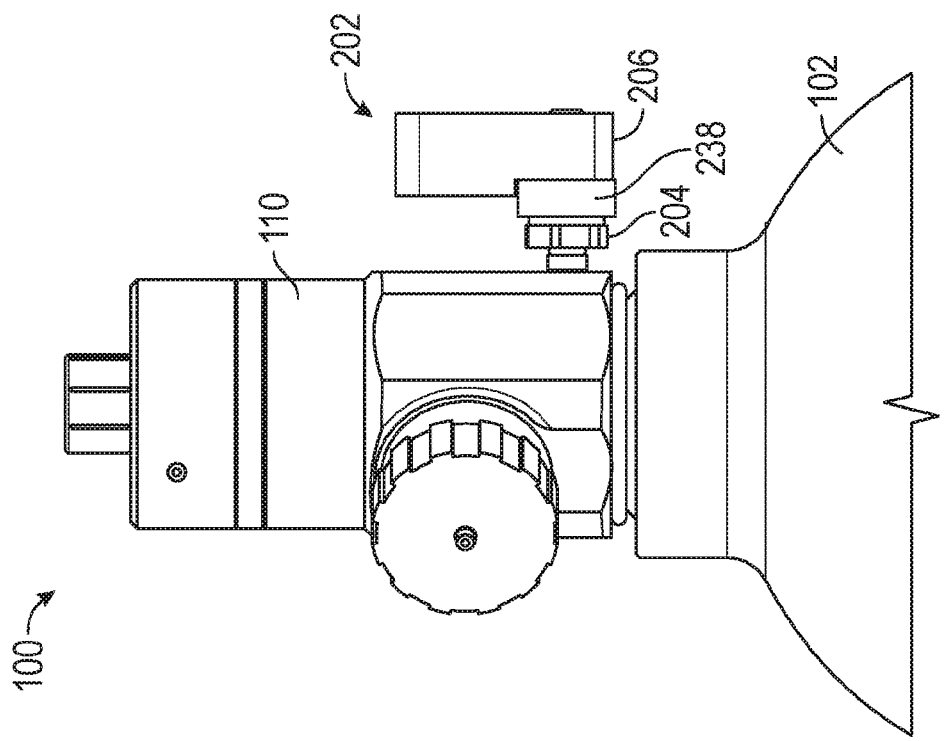
FIG. 10 is a side view of the tank, the actuator, and the sensor unit of FIG. 9.
Figure 9:
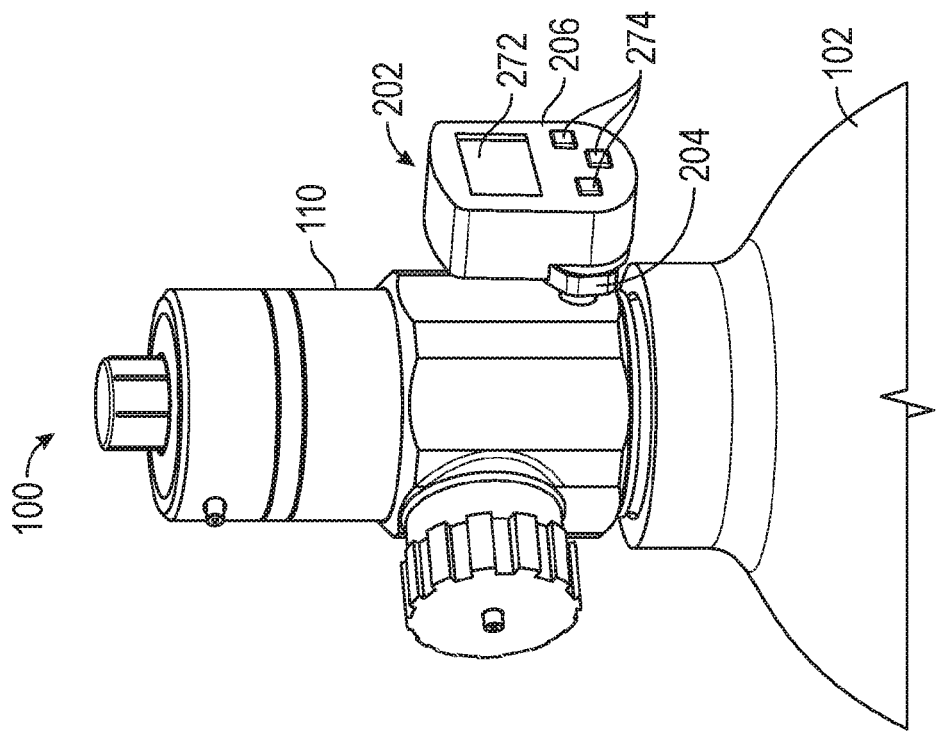
FIG. 9 is a perspective view of a tank, an actuator, and a sensor unit of a fire suppression system, according to an exemplary embodiment.

The housing 210 includes a tank interface portion, shown as fitting 212, configured to at least selectively couple to the tank 102, the actuator 110, and/or another device fluidly coupled to the internal volume of the tank 102. As shown in FIGS. 3-5, the fitting 212 is inserted into a fluid sensing aperture 214 defined by the actuator 110, through which the sensor unit 204 is fluidly coupled to the internal volume of the tank 102. FIGS. 9 and 10 illustrate an alternative embodiment of the actuator 110. The fitting 212 may be sized (e.g., diameter, thread shape, thread pitch, etc.) to engage with the fluid sensing aperture 214 of a specific aperture. In some embodiments, the fitting 212 is threaded to facilitate engagement with the fluid sensing aperture 214. As shown in FIG. 8, the housing 210 includes a hexagonal interface portion or nut, shown as wrench interface 216. The wrench interface 216 is configured to facilitate application of a torque to the sensor unit 204 (e.g., using a wrench) when threading the fitting 212 into the fluid sensing aperture 214. In other embodiments, the fitting 212 is otherwise coupled to the actuator 110. In yet other embodiments, the fitting 212 is directly coupled to the tank 102.

Figure 11:
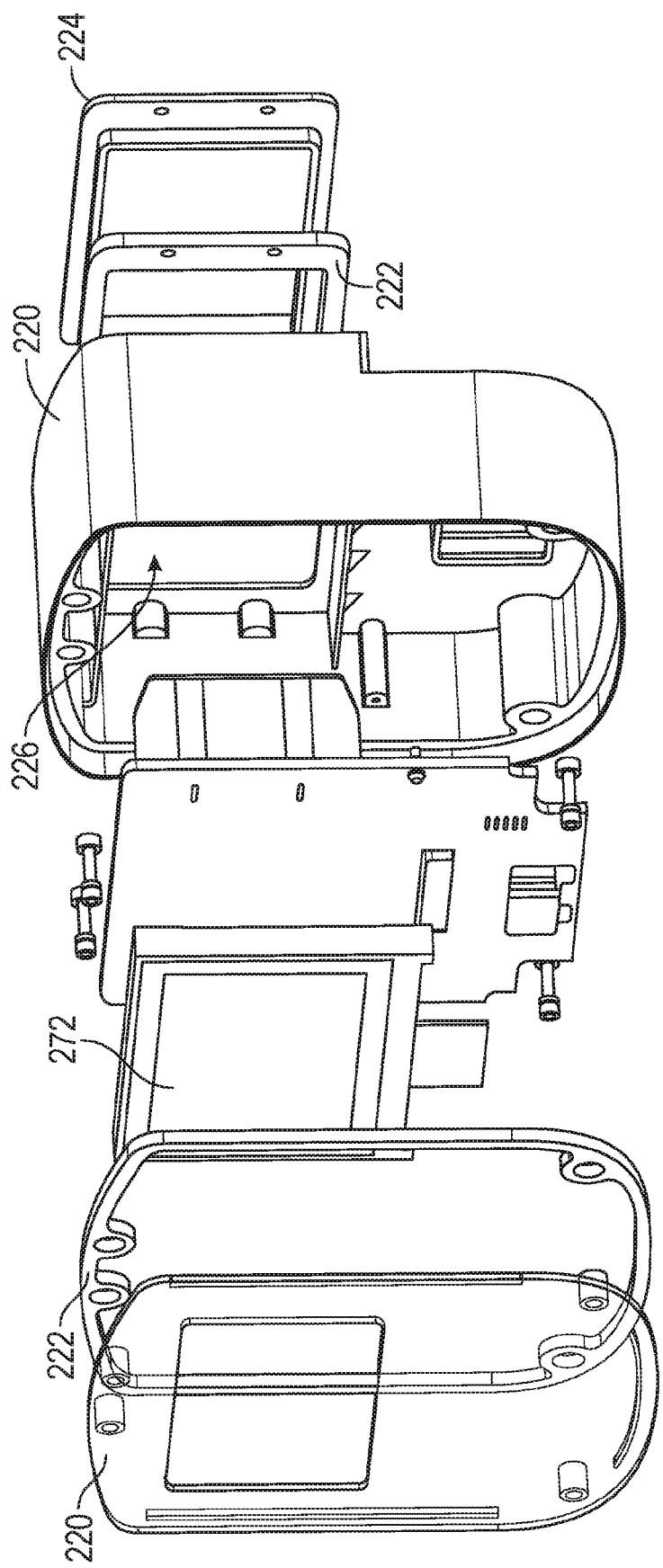
FIG. 11 is an exploded view of a display module of the sensor unit of FIG. 3.
Figure 12:
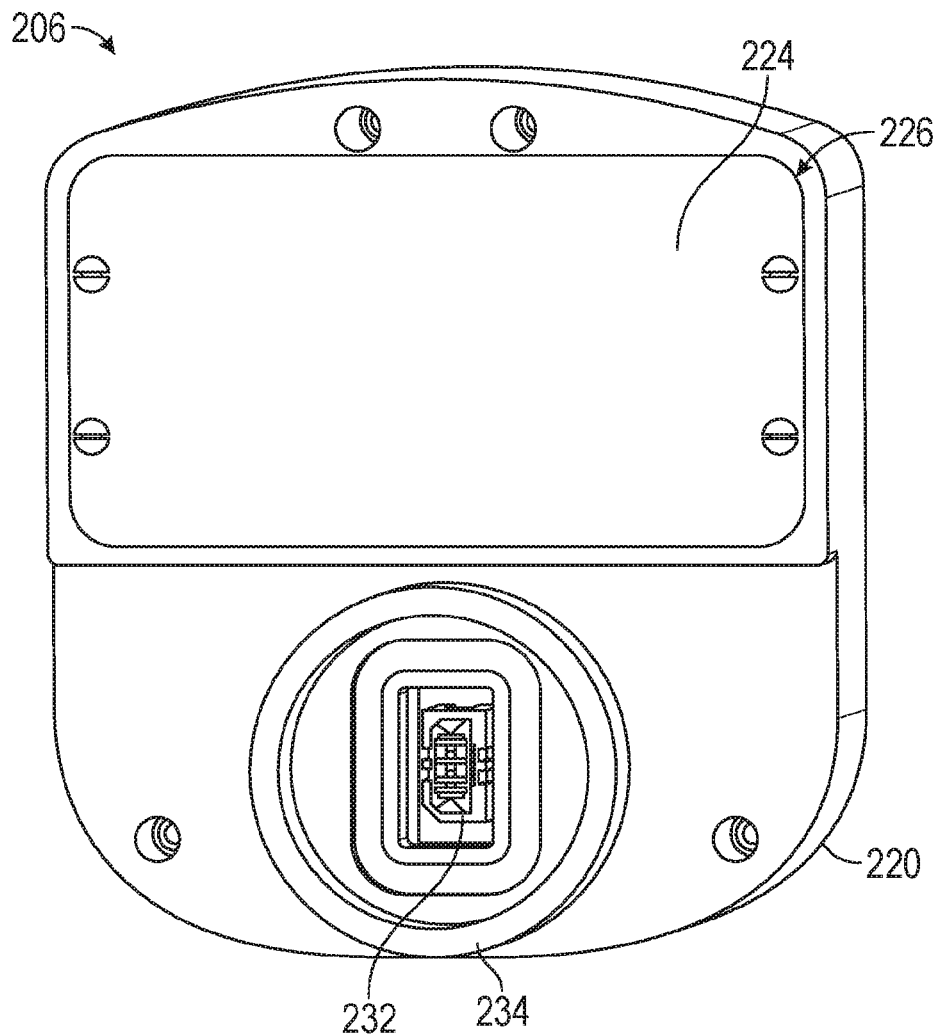
FIG. 12 is a rear view of the display module of FIG. 11.

Referring to FIGS. 11 and 12, the display unit 206 includes a housing 220. The housing 220 defines an internal volume configured to contain (e.g., completely, partially, etc.) the various components of the display unit 206. In some embodiments, the housing 220 is made from multiple sections that are coupled (e.g., fixedly coupled, fastened welded, adhered, etc.) to one another. In some embodiments, the housing 210 is substantially sealed. As shown, the housing includes a pair of gaskets or seals 222 that facilitate such sealing. In some embodiments, the housing 210 and the housing 220 are sealed to an IP67 rating. The housing 220 includes a door or panel, shown as battery door 224, that is selectively repositionable (i.e., selectively removable and reattachable in its entirety or movable between a closed position and an open position (e.g., via a hinge)) relative to the rest of the housing 220 to permit access to an internal volume of the housing 220 containing the power source 260 through an aperture, shown as battery aperture 226.

Referring to FIGS. 7, 8, 12, and 13, the sensor unit 204 and the display unit 206 are selectively coupled to one another such that they can be separated from one another (e.g., during transport or assembly). The sensor unit 204 includes a first connector (e.g., a female connector), shown as connector 230, and the display unit 206 includes a second connector (e.g., a male connector), shown as connector 232, configured to engage one another. When engaged with one another, the connector 230 and the connector 232 facilitate the transfer of power (i.e., electrical energy) and/or data (e.g., sensor data, commands, etc.) between the sensor unit 204 and the display unit 206.

Referring to FIGS. 7, 8, and 14-16, the housing 220 of the display unit 206 includes an annular or cylindrical protrusion, shown as connector boss 234. In some embodiments, the connector boss 234 at least partially surrounds the connector 232. A surface (e.g., an exterior surface, an interior surface) of the connector boss 234 is threaded. The housing 210 includes an annular or toroidal protrusion, shown as shoulder 236, extending radially outward from the rest of the housing 210. A fastener, shown as nut 238, is configured to receive the housing 210 and is rotatably coupled to the housing 210. A surface of the nut 238 (e.g., an interior surface, an exterior surface) of the nut 238 is threaded, corresponding to the thread of the connector boss 234. To couple the sensor unit 204 to the display unit 206, the connector 230 and the connector 232 are aligned and engaged with one another. The nut 238 is threaded onto the connector boss 234, and a surface of the nut 238 engages the shoulder 236. When tightened, the connector 230 and the connector 232 are substantially sealed between the housing 210, the housing 220, and the nut 238. Accordingly, the electronic gauge 202 may be sealed (e.g., from liquids, from dust, to the IP67 standard, etc.) except for a sensor port defined by the sensor unit 204 that fluidly couples the interior volume of the tank 102 to a pressure and/or temperature sensor.

Separating the sensor unit 204 from the display unit 206 may be advantageous when transporting and installing the electronic gauge 202. In some embodiments, the sensor unit 204 may be more durable than the display unit 206. Additionally, when connected to the sensor unit 204, the display unit 206 extends away from the sensor unit 204 and the actuator 110, increasing the potential for damage by exposing the display unit 206 to contact with other items during shipping, handling, installation, etc. During manufacturing, assembly, transportation, and installation of the tank 102, the actuator 110, and the electronic gauge 202, the display unit 206 may be removed from the sensor unit 204. By way of example, actuator 110 and the sensor unit 204 may be assembled with one another at a factory and transported together (e.g., within a single cap) to the installation site. The display unit 206 may be coupled to the sensor unit 204 as one of the final installation steps. Removing the display unit 206 may additionally make installation of the sensor unit 204 less cumbersome (e.g., by removing the obstruction caused by the display unit 206 blocking access to the wrench interface 216 of the sensor unit 204). In other embodiments, the sensor unit 204 and the display unit 206 are integrally formed, though the integral sensor unit does not provide all of the same advantages as the separable sensor unit 204 and display unit 206.

Figure 2:
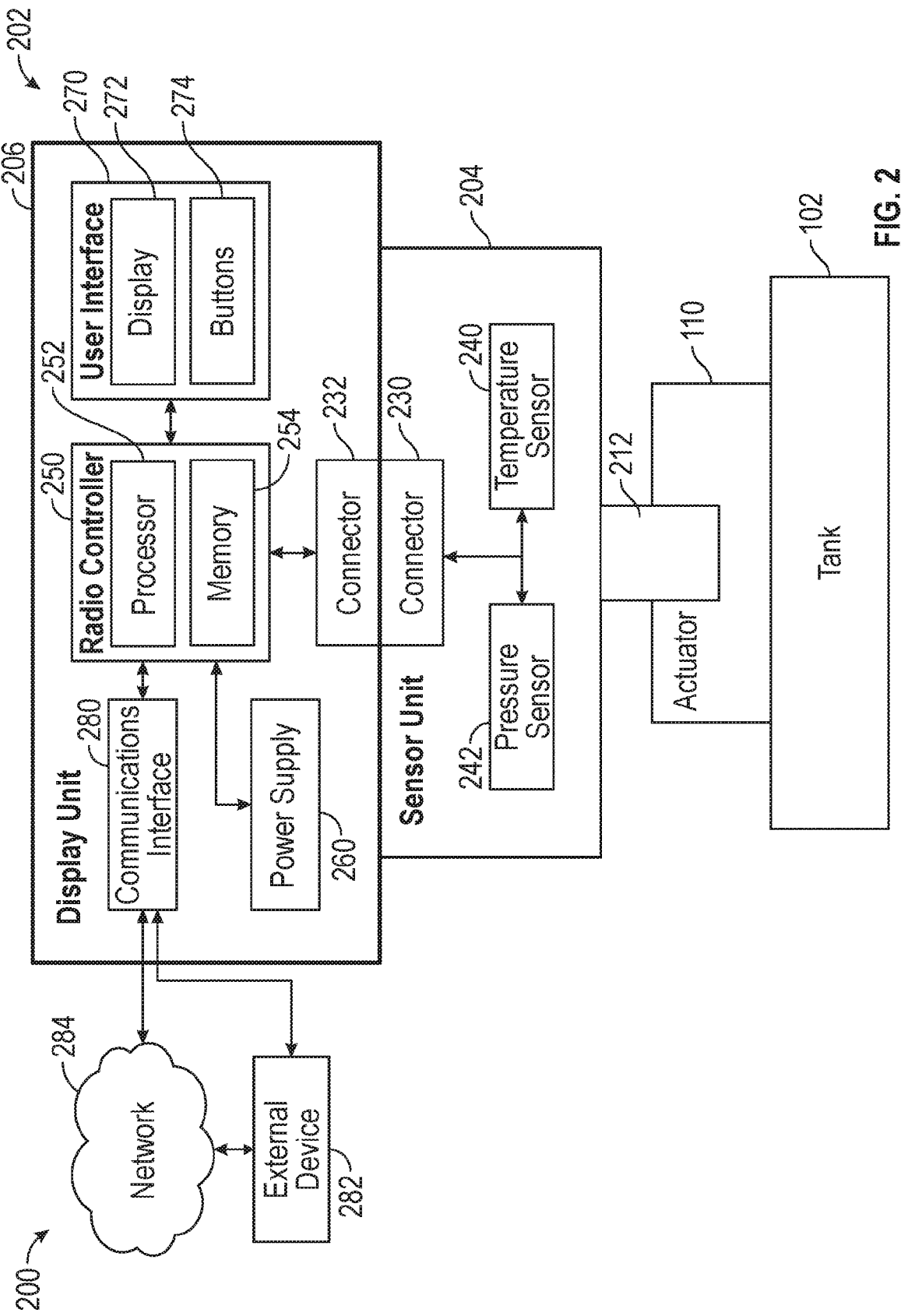
FIG. 2 is a block diagram of a monitoring system of the fire suppression system of FIG. 1.

Referring to FIG. 2, the sensor unit 204 includes a pair of sensors, shown as temperature sensor 240 and pressure sensor 242, operatively coupled to the connector 230. The temperature sensor 240 is fluidly coupled to the fluid within the tank 102 (e.g., through the fitting 212). The temperature sensor 240 is configured to sense a temperature of the fluid and provide temperature data related to (e.g., containing) the sensed temperature. By way of example, the temperature sensor 240 may include a thermistor, a resistance temperature detector, a thermocouple, a semiconductor, or another type of temperature sensor. In other embodiments, the temperature sensor 240 is configured to sense a temperature of an object or fluid that is in thermal communication with the fluid within the tank 102 (e.g., the ambient temperature of the air surrounding the tank 102, the temperature of a wall of the tank 102, a temperature of the actuator 110, etc.). Such temperatures may be related to (e.g., approximately equal to) the temperature of the fluid within the tank 102 (e.g., in situations where the ambient temperature changes slowly), and thus may be used to determine the temperature of the fluid within the tank 102. The pressure sensor 242 is fluidly coupled to the fluid within the tank 102 (e.g., through the fitting). The pressure sensor 242 is configured to sense a pressure (e.g., a gauge pressure) of the fluid and provide pressure data related to (e.g., containing) the sensed pressure. By way of example, the pressure sensor 242 may include a capacitive pressure sensor, a piezoelectric pressure sensor, an electromagnetic pressure sensor, an optical pressure sensor, or another type of pressure sensor. In some embodiments, the temperature sensor 240 and the pressure sensor 242 are integrated into a single component. By way of example, a model TI-1 OEM pressure transducer produced by WIKA may serve as both the temperature sensor 240 and the pressure sensor 242.

In other embodiments, the sensor unit 204 additionally or alternatively includes another type of sensor that provides data indicative of the presence of a leak within the tank 102. By way of example, the sensor unit 204 may include a conductivity sensor (e.g., an ohmmeter) configured to measure an electrical conductivity of the fluid within the tank 102. Some fire suppressant agents may have an electrical conductivity that varies based on its density (e.g., the number of moles of gas within a unit volume) and/or concentration. By way of example, as agent leaks from the tank, the density of the agent may decrease, varying the electrical conductivity of the fluid and thus permitting detection of a leak based on the data from the sensor. By way of another example, the sensor unit 204 may include a mass or weight sensor (e.g., a scale, a strain gauge, etc.) configured to measure a total mass or weight of the tank 102 and the fluid. As the fluid leaks, the total mass may decrease, permitting detection of a leak based on the data from the sensor. By way of another example, the sensor unit 204 may include an actuator (e.g., a speaker, a striker, such as a hammer, etc.) configured to excite the tank 102, causing it to vibrate, and a vibration sensor (e.g., an accelerometer, a microphone, etc.) configured to measure the resultant vibration of the tank 102. As agent leaks from the tank 102, the frequency and/or amplitude of the resultant vibration may vary, permitting detection of a leak based on the data from the sensor. By way of another example, the sensor unit 204 may include a distance sensor (e.g., an optical sensor such as an infrared sensor or camera, an ultrasonic sensor) configured to measure the height of the liquid within the tank 102. As the agent leaks, the height of the liquid in the tank 102 may decrease, permitting detection of a leak based on the data from the sensor.

The display unit 206 includes a controller, processing circuit, or microprocessor, shown as radio controller 250. The radio controller 250 is configured to communicate with and control operation of other components of the electronic gauge 202. The communication may be one way communication or two way communication. The radio controller 250 includes a processor 252 and a memory device, shown as memory 254. The memory 254 may be configured to store data (e.g., temperature data, pressure data, etc.). The memory 254 may additionally or alternatively be configured to store control logic that is executed by the processor 252 to operate the electronic gauge 202. As shown, the radio controller 250 is operatively coupled to (e.g., in communication with) the temperature sensor 240 and the pressure sensor 242 through the connector 230 and the connector 232.

Figure 13:
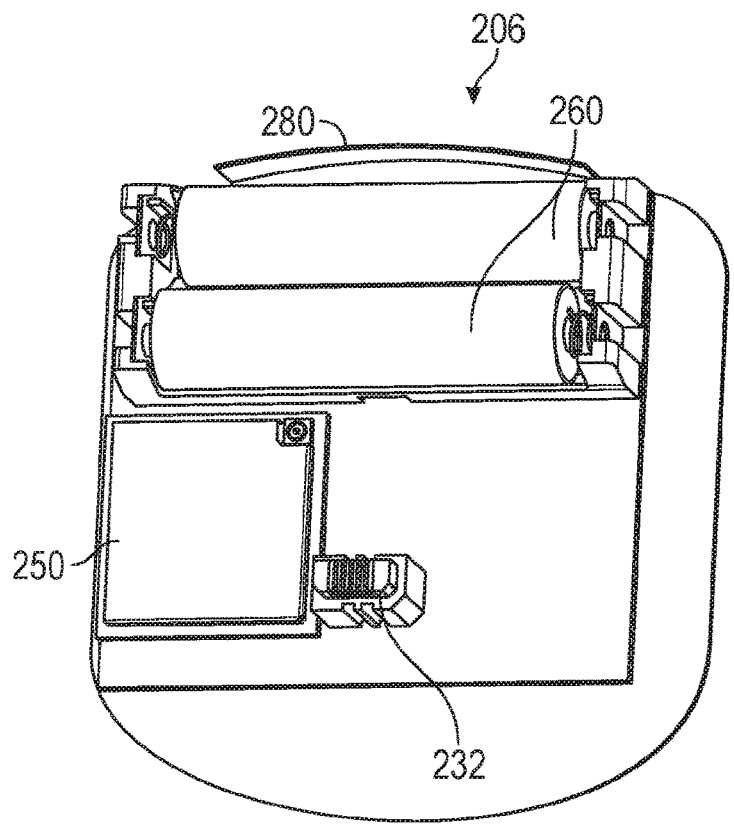
FIG. 13 is a rear view of the display module of FIG. 11 with a housing removed.
Figure 14:
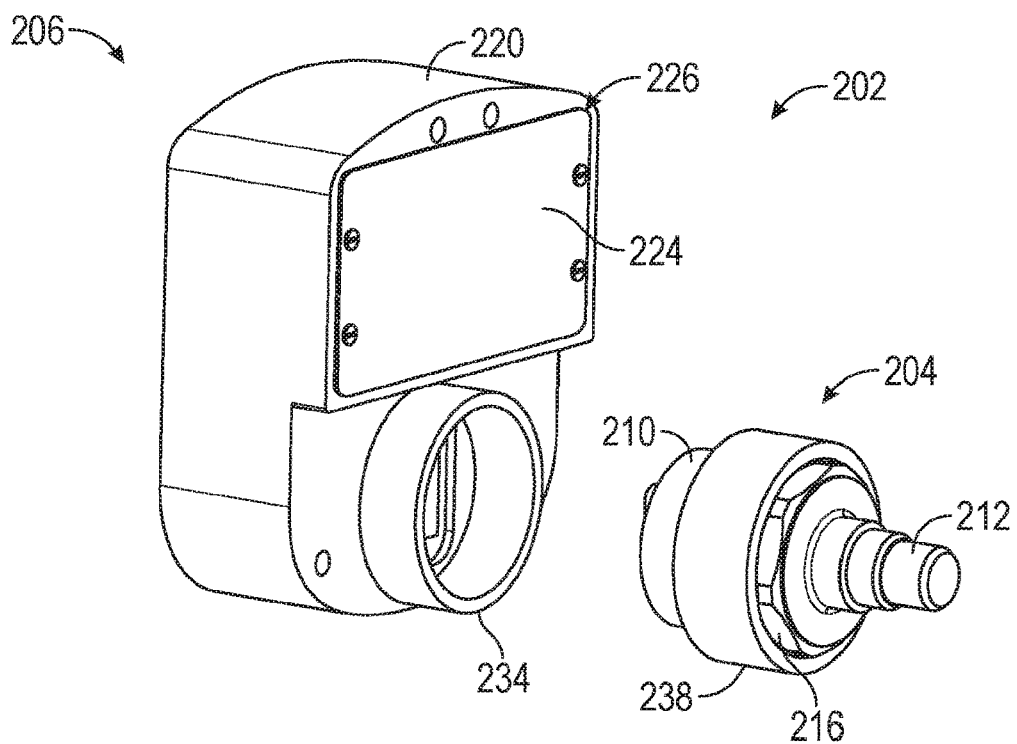
FIGS. 14-16 are perspective views illustrating the assembly of the sensor unit of FIG. 3.
Figure 15:
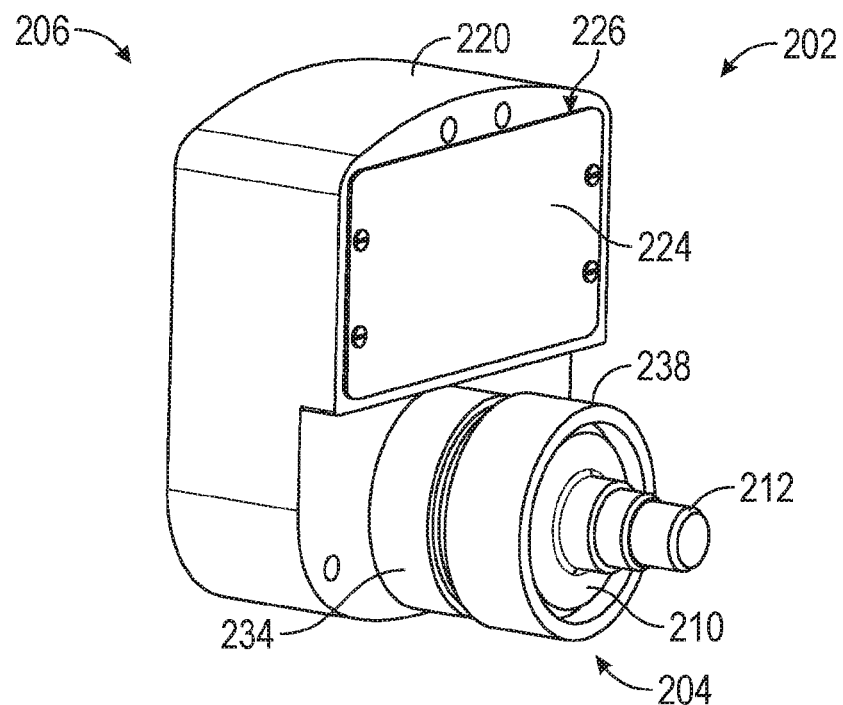
Figure 16:
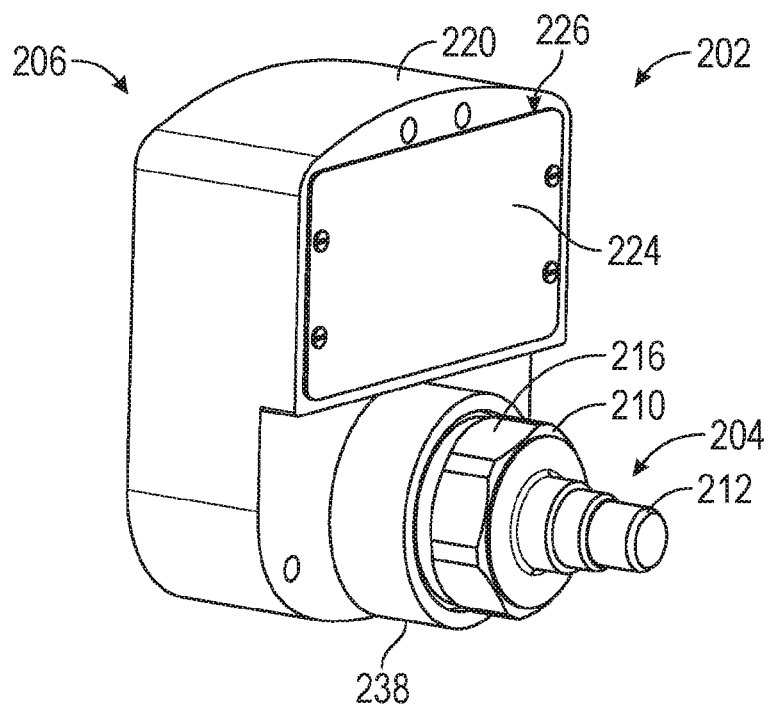

Referring to FIGS. 2 and 13, the display unit 206 includes a power source 260. The power source 260 is configured to provide electrical energy to power the other components of the electronic gauge 202. Although FIG. 2 shows the power source 260 as providing power to the other components through the radio controller 250, in other embodiments the power source 260 powers the other components directly. In some embodiments, the power source 260 includes a local power storage device (e.g., batteries, capacitors, etc.). As shown in FIG. 2, the power source 260 includes two batteries. These batteries may be accessed (e.g., for insertion, for removal, etc.) through the battery aperture 226. In one embodiment, the batteries are 1.5 Volt, lithium-based AA batteries (e.g., model L91 by Energizer). In this embodiment, the batteries may be capable of powering the electronic gauge 202 for over a year prior to requiring recharging or replacement. The power source 260 may additionally or alternatively include a connection to an external power source, such as a generator, a solar panel, or a power grid.

Figure 6:
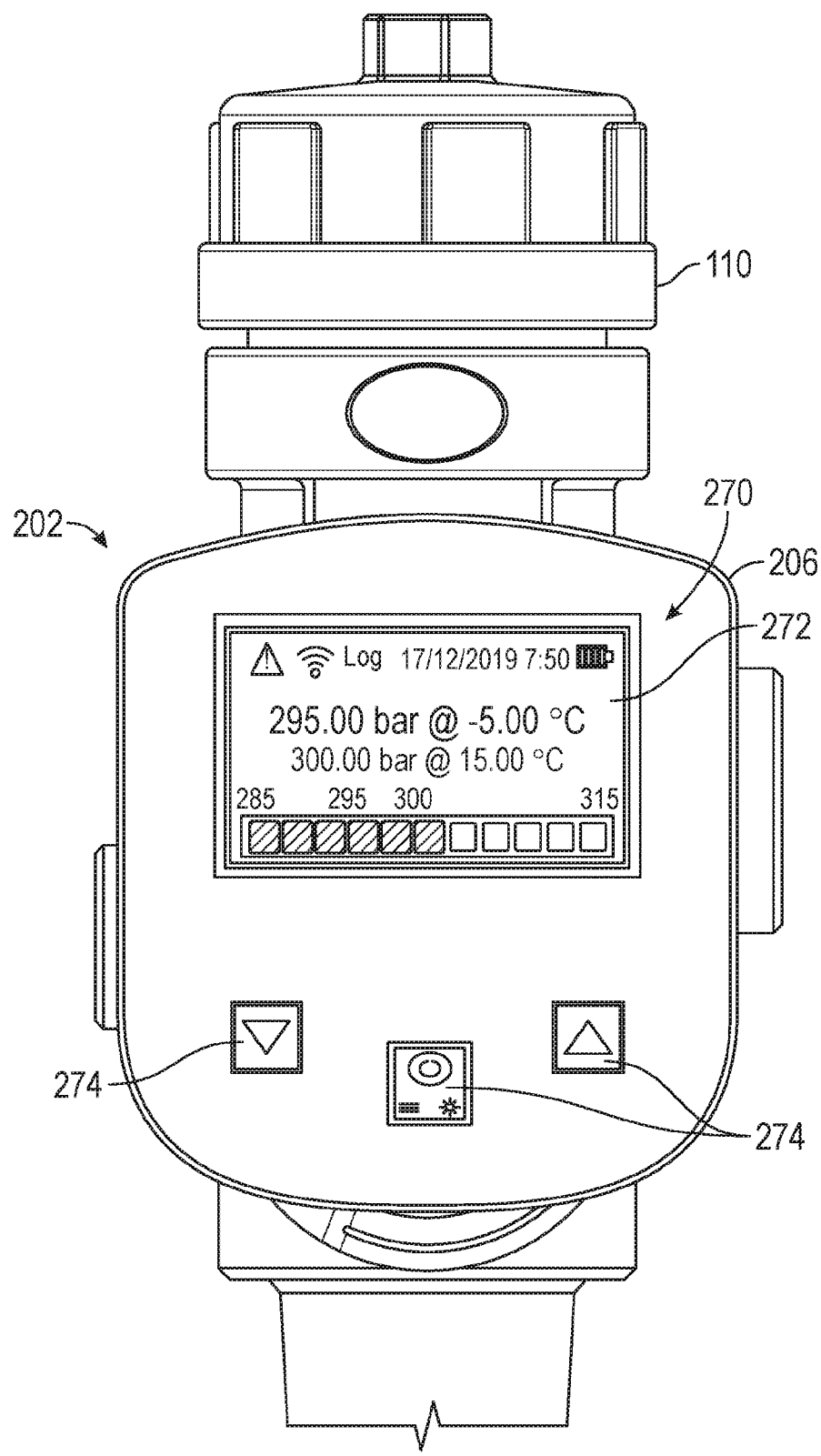
FIG. 6 is a front view of the actuator and the sensor unit of FIG. 3.

Referring to FIGS. 2, 6, and 11, the display unit 206 further includes a user interface 270 configured to provide information to a user and/or to receive information (e.g., commands) from a user. The user interface 270 is operatively coupled to the radio controller 250. The user interface 270 includes an output device, shown as display 272 configured to provide information to a user. As shown in FIGS. 6 and 11, the display 272 is a liquid crystal display (LCD). By way of example, the display 272 may include a model PE12864 display made by POWERTIP. The user interface 270 may include any type of output device that can provide information to a user, such as another type of display, lights (e.g., LED's), speakers, or vibrators. The user interface 270 further includes an input device, shown as buttons 274. As shown in FIG. 6, the user interface 270 includes three buttons 274 adjacent the display 272. The user use the buttons 274 to provide commands, navigate through menus, input data, or otherwise provide information to the radio controller 250. The user interface 270 may include any type of input device that can receive information from a user, such as buttons, knobs, switches, levers, joysticks, touchscreens, or microphones. In some embodiments, the display 272 is configured to display the temperature data and/or the pressure data to a user (e.g., as the current temperature and current pressure, etc.).

Referring to FIG. 2, the display unit 206 further includes a communications interface (e.g., a network interface, a port, an antenna, etc.), shown as communications interface 280, operatively coupled to the radio controller 250. The communications interface 280 is configured to communicate with another device, shown as external device 282. In some embodiments, the communications interface 280 communicates directly with the external device 282. In other embodiments, the communications interface 280 communicates with the external device 282 through a network 284. The communications interface 280 may provide one way or two way communication. The communications interface 280 may transfer data (e.g., pressure data, temperature data, etc.), commands, or other information between the radio controller 250 and the external device 282.

In some embodiments, the communications interface 280 communicates over a wireless connection. In some such embodiments, the communications interface 280 communicates using the LoRa wireless protocol. LoRa communications may be require a relatively low power consumption and may function over large distances (e.g., up to 10 miles outdoors and up to 3 miles within a building). LoRa communications may operate over frequency bands specific to the country of operation (e.g., 867-869 MHz for Europe, 902-928 MHz for North and South America, etc.). To facilitate communication using the LoRa protocol, the communications interface 280 may include a LoRa controller or module (e.g., a MultiConnect xDot made by Multitech) operatively coupled to a LoRa antenna (e.g., a 915/868 MHz ISM Flexible Polymer antenna made by 2J Antennas). The antenna may facilitate transmitting and receiving radio waves to communicate data. In some embodiments, the antenna is flexible to facilitate placement of the antenna within the housing 220 (e.g., adhered to an inner surface of the housing 220). In other embodiments, the communications interface 280 is configured to communicate using a different type of wireless communication (e.g., Wi-Fi, Bluetooth, Zigbee, infrared, radio, etc.). Additionally or alternatively, the communications interface may be configured to communicate over a hardwired connection (e.g., a USB connection, an Ethernet connection, a fiber optic connection, etc.).

As shown, certain components are stored within the sensor unit 204 and the display unit 206. In other embodiments, one or more of the components are moved to the other module or shared between both modules. By way of example, the radio controller 250 may be stored within the sensor unit 204. In yet other embodiments, one or more of the components may be duplicated such that both modules include one or more of the components. By way of example, the sensor unit 204 and the display unit 206 may each include a power source 260.

Network

Figure 17:
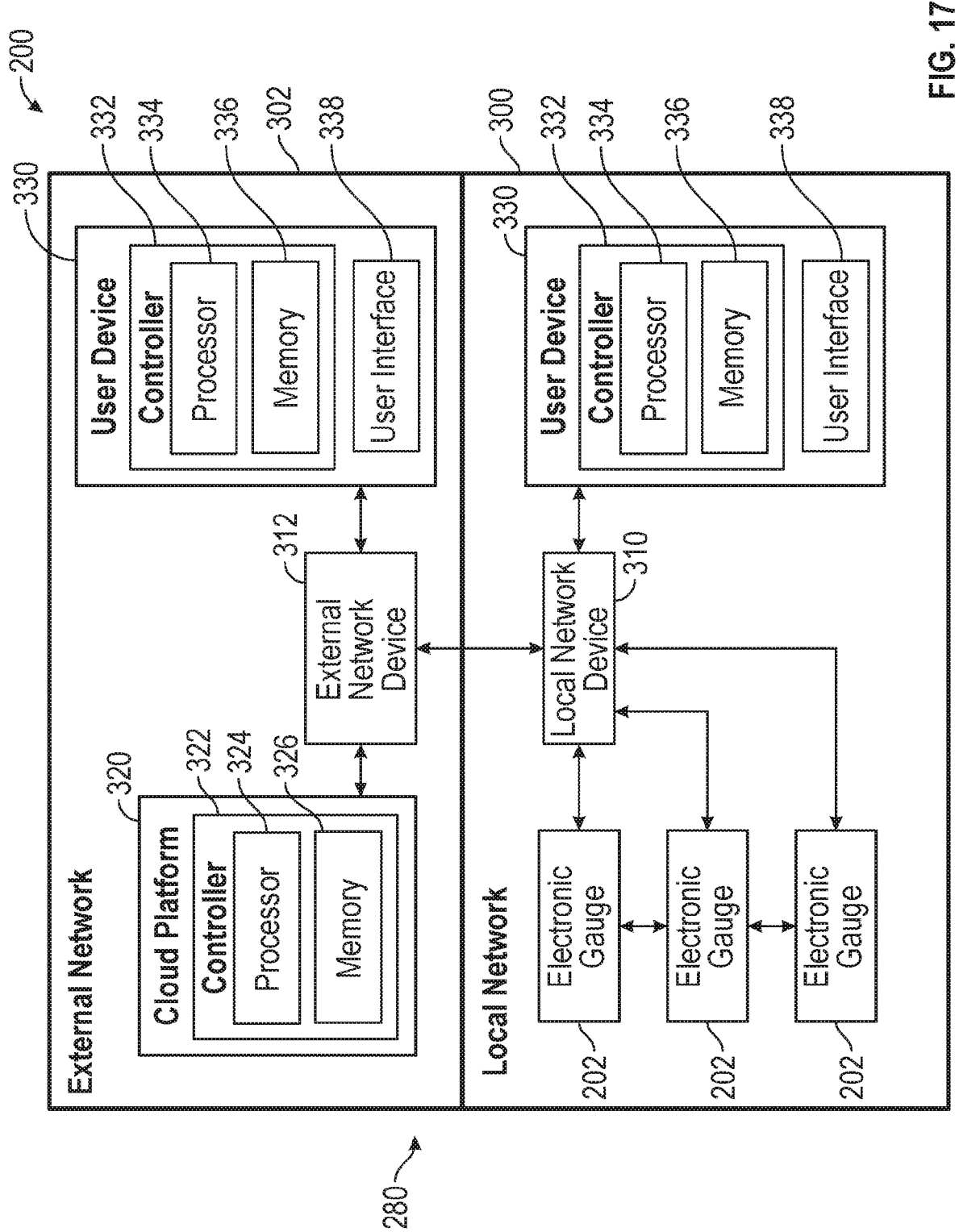
FIG. 17 is a block diagram of the monitoring system of FIG. 2.

Referring to FIG. 17, the network 284 is shown according to an exemplary embodiment. In some embodiments, the network 284 is at least one of and/or a combination of a Wi-Fi network, a wired Ethernet network, a ZigBee network, a Bluetooth network, and/or any other wireless network. The network 284 may include a local area network or a wide area network (e.g., the Internet, a building WAN, etc.)

and may use a variety of communications protocols (e.g., BACnet, IP, LON, etc.). The network 284 may include routers, modems, servers, cell towers, satellites, and/or network switches. The network 284 may be a combination of wired and wireless networks.

The network 284 includes a local network 300 and an external network 302. The local network 300 may be contained within a single building or structure or spread across a campus or other group of related buildings. The components of the local network 300 may be physically located on-site. In some embodiments, the components of the local network 300 are distributed across multiple buildings. The external network 302 may extend outside of the local network 300 and include off-site devices. By way of example, the external network 302 may include one or more devices located in a remote datacenter.

The local network 300 includes one or more local network devices 310. The local network devices 310 may facilitate communication between the electronic gauges 202 and/or one or more devices of the local network or the external network 302. The local network devices 310 may include routers, gateways, switches, access points, or other devices. The local network devices 310 may be configured for wired or wireless communication. In some embodiments, the local network devices 310 include a cloud gateway that communicates directly with the electronic gauges 202 using the LoRa communications protocol. The cloud gateway may communicate with the external network 302 (e.g., with the Internet) through a cellular connection and/or through a router or modem. The cloud gateway may transfer information (e.g., temperature data, pressure data, etc.) from the electronic gauges 202 to a device within the external network 302 (e.g., the cloud platform 320). In some embodiments, the cloud gateway solely transfers information and does not process or analyze the information.

In some embodiments, the electronic gauges 202 are configured to communicate directly with one another. By way of example, one of the electronic gauges 202 may pass communications from another electronic gauge 202 to the local network devices 310 (i.e., the electronic gauges 202 may communicate through one another). In this arrangement, one of the electronic gauges 202 may configured to communicate directly with the local network device 310 (e.g., using an Ethernet connection), and the rest of the electronic gauges 202 can communicate with the local network device 310 without having to be directly connected to the local network device 310.

The external network 302 includes one or more external network devices 312. The external network devices 312 may facilitate communication between the local network 300 and one or more other devices of the external network 302. The external network devices 312 may include cellular towers, datacenters, or any other components associated with transmission, processing, and/or storage of data.

The external network 302 includes a data storage and processing system, shown as cloud platform 320, configured to store and process data (e.g., the temperature and pressure data, etc.). A cloud controller (e.g., a processing circuit, a microprocessor, a controller, etc.), shown as controller 322, is implemented within the cloud platform 320. The controller 322 may be a hardware-defined controller or a software-defined controller. The controller 322 includes a processor 324 and a memory device, shown as memory 326. Although the cloud platform 320 is shown within the external network 302 (e.g., such that the electronic gauges 202 communicate with the cloud platform 320 through the Internet), the local network 300 may additionally or alternatively include a cloud platform 320. In other embodiments, the cloud platform 320 is omitted.

In some embodiments, the cloud platform 320 is configured to receive data from and/or control components of other systems. By way of example, the cloud platform 320 may control one or more systems of building containing the space 10 (e.g., as a building management system). The cloud platform 320 may communicate with one or more Internet of Things (IoT) devices. It should be noted that the components of the cloud platform 320 can be integrated within a single device (e.g., a supervisory controller, an IoT device controller, etc.) or distributed across multiple separate systems or devices. In other embodiments, some or all of the components of the cloud platform 320 can be implemented as part of a cloud-based computing system configured to receive and process data from one or more systems, devices, and/or components. In other embodiments, some or all of the components of the cloud platform 320 can be components of a subsystem level controller, a subplant controller, a device controller, a field controller, a computer workstation, a client device, or any other system or device that receives and processes data from IoT devices.

The local network 300 and/or the external network 302 include one or more devices (e.g., smartphones, tablets, laptop computers, desktop computers, servers, etc.), shown as user devices 330. As shown, the user device 330 includes a controller (e.g., a processing circuit, a microprocessor, etc.), shown as controller 332. The controller 332 includes a processor 334 and a memory device, shown as memory 336. The controller 332 of the user device 330 may be configured to store and/or process data. The user devices 330 may further include a user interface device, shown as user interface 338. The user interface 338 may include any type of device used to provide or receive information (e.g., keyboards, mice, touchscreens, displays, microphones, speakers, lights, etc.). The user interface 338 may be configured to receive information (e.g., commands) from a user and/or provide information (e.g., as a notification, as part of a graphical user interface (GUI), etc.) to a user. The user devices 330 may be configured to communicate with the electronic gauges 202 and/or the cloud platform 320 directly and/or through the local network devices 310 and/or the external network devices 312.

Processing of Temperature and Pressure Data

Figure 18:
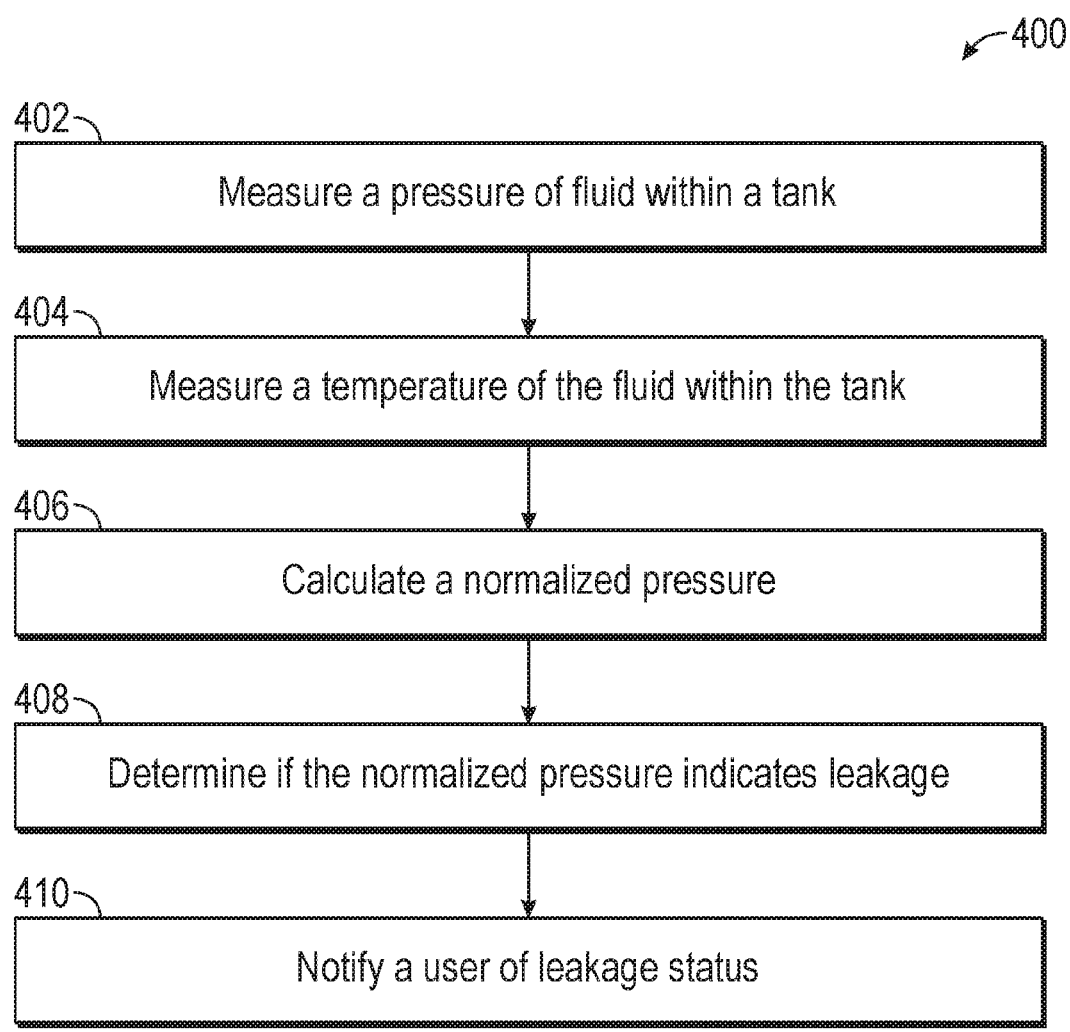
FIG. 18 is a block diagram of a method of monitoring leakage within a fire suppression system, according to an exemplary embodiment.

Referring to FIG. 18, a method of monitoring leakage within the fire suppression system 100 is shown as method 400 according to an exemplary embodiment. Using this method, the monitoring system 200 (including multiple electronic gauges 202 and a cloud platform 320 for data storage and processing) monitors the temperature and pressure of the fluid within each of the tanks 102. The monitoring system 200 calculates a normalized pressure for each tank 102 that accounts for changes in pressure due to fluctuations in temperature. Based on the normalized pressure, the monitoring system 200 determines if one or more of the tanks 102 are leaking. The monitoring system 200 indicates the leakage status of each of the tanks 102 (e.g., whether or not each tank 102 is leaking) to a user.

In step 402, a pressure of the fluid within a tank 102 is sensed. Specifically, each electronic gauge 202 uses the pressure sensor 242 to sense the pressure of the fluid within the associated tank 102 at a given time. The pressure of the fluid within each tank 102 may be referred to herein as pressure data. In some embodiments, the pressure data also includes the time at which each pressure measurement is taken.

In step 404, a temperature of the fluid within the tanks 102 is sensed. Specifically, each electronic gauge 202 uses the temperature sensor 240 to sense the temperature within the associated tank 102 at a given time. In some embodiments, the pressure and the temperature are sensed at substantially the same time. The temperature of the fluid within each tank 102 may be referred to herein as temperature data. In some embodiments, the temperature data also includes the time at which the temperature measurement was taken.

In other embodiments, the temperature sensor 240 senses the temperature of the fluid indirectly. By way of example, the temperature sensor 240 may sense the temperature of an object or of a fluid that is in thermal communication with the fluid and, as such, has a similar temperature to that of the fluid. By way of example, the temperature sensor 240 may sense the temperature of a wall of the tank 102, the ambient air surrounding the tank 102, the electronic gauge 202, the actuator 110, or another object or fluid thermally coupled to the fluid.

In step 406, a normalized pressure is calculated. Specifically, the monitoring system 200 employs a pressure normalization algorithm that takes the temperature data and the pressure data as inputs and provides the normalized pressure. Normalizing the pressure removes or decreases the effect of temperature on the pressure within the tank 102. The tank 102 has a fixed volume. Accordingly, the normalized pressure represents solely or almost solely the amount of fluid in the tank 102 (e.g., a non-negligible or significant change in the normalized pressure can only be caused by a change in the amount of fluid within the tank 102). As such, a decrease in normalized pressure indicates that fluid has leaked from the tank 102, regardless of the temperature of the fluid. Although the method 400 is described as using a normalized pressure having units of pressure (e.g., bar, psi, etc.), in other embodiments, the normalized pressure is another quantity that is calculated using the temperature data and the pressure data and represents the amount of fluid in the tank 102. By way of example, the normalized pressure may be a dimensionless quantity.

Figure 19:
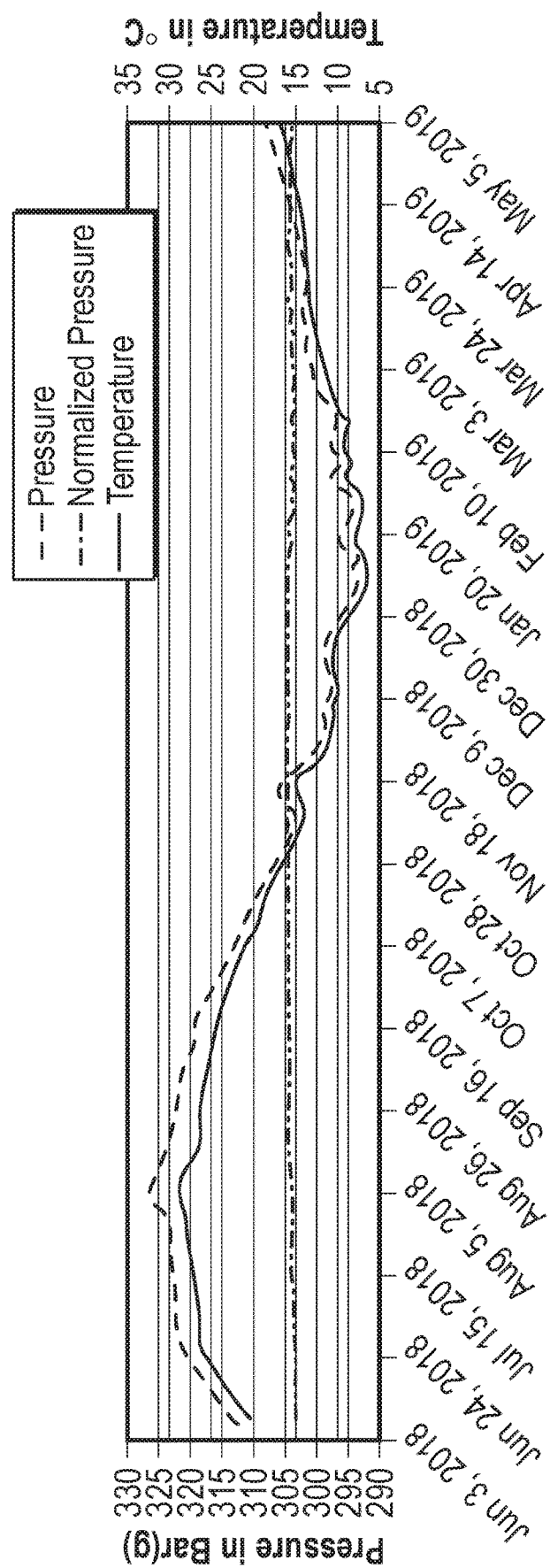
FIG. 19 is a graph of a pressure, a temperature, and a normalized pressure of a fluid within a tank of a fire suppression system, according to an exemplary embodiment.

FIG. 19 compares the temperature, the pressure, and the normalized pressure of a sealed tank 102 (i.e., a tank 102 that loses a negligible amount of fluid) over the course of a year. As shown, the temperature of the fluid changes approximately 30° C. throughout the year. The pressure of the fluid within the tank 102 closely correlates with the temperature. However, the normalized pressure remains substantially constant throughout the year, indicating that a negligible amount of fluid leaked from the tank 102.

The pressure normalization algorithm used to calculate the normalized pressure may be determined mathematically (e.g., by treating the fluid as an ideal gas, etc.) and/or experimentally. Different algorithms may be used for different types of fluid. By way of example, fluids that remain gaseous at high pressures (e.g., the pressure within the tank 102) may have a different pressure-temperature relationship than fluids that change from a gas to a liquid at high pressures. The algorithms may be predetermined and stored in a memory (e.g., the memory 254, etc.). During setup of the monitoring system 200, the user may provide the identity of the fluid (e.g., the particular suppressant agent stored in the tank 102), and the monitoring system 200 may use this identity to determine which algorithm should be used.

In step 408, it is determined if the normalized pressure indicates leakage. Specifically, the monitoring system 200 compares the normalized pressure against one or more criteria to determine if the normalized pressure indicates that the tank 102 has leaked. By way of example, the monitoring system 200 may compare the normalized pressure against a threshold normalized pressure. If the normalized pressure is below (e.g., below, a fixed amount below, a percentage below, such as 1.5% below, etc.) the threshold normalized pressure, then the monitoring system 200 may determine that the tank 102 has leaked or is leaking. In some embodiments, the threshold normalized pressure is the normalized pressure of the tank 102 determined when the tank 102 is known to be full (e.g., when the tank 102 is first installed). By way of another example, the monitoring system 200 may compare the rate of change of the normalized pressure to a threshold rate of change. If the normalized pressure is decreasing at greater than a threshold rate, then the monitoring system 200 may determine that the tank 102 is leaking.

When determining if a tank of fluid is leaking, other systems utilize solely pressure data. Specifically, other systems determine that a tank has leaked if the sensed pressure drops below a threshold pressure. However, because the pressure is dependent upon the temperature, this methodology may not be accurate when the fluid experiences large changes in temperature. As shown in FIG. 19, the sensed pressure varies approximately 40 bar overall for a temperature change of approximately 30° C. overall. This variation in the sensed pressure could lead to false determination that the tank 102 is leaking when no leakage has occurred or to delayed detection of leakage. As shown in FIG. 19, the normalized pressure is nearly constant, regardless of this change in temperature. Accordingly, in environments where the tanks 102 experience changes in ambient temperature, using the normalized pressure to determine if the tank 102 has leaked or is leaking is more accurate than using solely pressure data. Using normalized pressure reduces or eliminates false alarms as compared to conventional switched pressure monitor system, which may switch and indicate a low pressure alarm due to pressure variations caused by temperature change rather than a leak in the tank 102.

Steps 406 and 408 may be completed by any device or combination of devices of the monitoring system 200 (e.g., an electronic gauge 202, a cloud platform 320, a user device 330, etc.). By way of example, the radio controller 250 of the electronic gauge 202 may calculate the normalized pressure and determine if the tank 102 is leaking. By way of another example, the electronic gauge 202 may transfer the temperature data and the pressure data to the cloud platform 320, and the cloud platform 320 may calculate the normalized pressure determine if the tank 102 is leaking. By way of another example, the electronic gauge 202 may transfer the temperature data and the pressure data to the cloud platform 320, the cloud platform 320 may calculate the normalized pressure, the cloud platform 320 may transfer the normalized pressure to a user device 330, and the user device 330 may determine if the tank 102 is leaking.

In other embodiments, leakage of the fluid from the tank 102 is detected using one of the other types of sensors described herein. By way of example, the monitoring system 200 may determine that the tank 102 has leaked in response to a change in the electrical conductivity of the fluid within the tank 102. By way of another example, the monitoring system 200 may determine that the tank 102 has leaked in response to a decrease in the total mass or weight of the tank 102 and the fluid. By way of another example, the monitoring system 200 may determine that the tank 102 has leaked in response to a change in the frequency or amplitude of a response of the tank 102 to being excited (e.g., by striking the tank 102). By way of another example, the monitoring system 200 may determine that the tank 102 has leaked in response to a decrease in the height of a liquid within the tank 102.

In step 410, one or more users are notified of the leakage status. The electronic gauge 202, the cloud platform 320, and/or the user device 330 provide the leakage status (i.e., whether or not the tank 102 was determined to be leaking) to the user. The monitoring system 200 may provide the leakage status through the user interface 270, the user interface 338, or another user interface. By way of example, the user interface 270 may light up, flash, display a message, or otherwise notify a user in response to a determination that the corresponding tank 102 has leaked. By way of another example, the cloud platform 320 may provide a notification (e.g., an email, a text message, an application notification, etc.) to the user device 330 in response to a determination that one of the tanks 102 has leaked. Such a notification may identify the tank 102 that is leaking (e.g., by providing an identification number or location of the tank 102).

In some embodiments, the user device 330 runs an application or program that provides a graphical user interface (GUI). Through the GUI, the user may view the temperature data, the pressure data, the normalized pressure, that status of each tank 102, and/or other information. By way of example, the electronic gauges 202 may be connected to a cloud platform 320, and a user may register each of the electronic gauges 202 to an account on the cloud platform 320. Upon logging into the account, the GUI may display information relating to all of the connected electronic gauges 202. The GUI may provide a graph similar to FIG. 19 that illustrates the temperature, the pressure, and the normalized pressure for each tank 102 over time. The GUI may indicate the status of the connection of the electronic gauges 202 to the cloud device (e.g., connected, disconnected, etc.), the charge level of the power source (e.g., if the power source 260 includes batteries), and whether or not each electronic gauge 202 requires maintenance. In response to detection of certain conditions, the GUI may provide instructions to a user. By way of example, in response to determining that one of the tanks 102 is leaking, the GUI may instruct the user to replace the tank 102 and/or provide the user with the contact information of a representative that will replace the tank 102.

Providing a user with specific status information about each tank 102 in a system improves upon conventional pressure monitoring systems that monitor all tanks as a group. In such conventional systems, a low pressure or leak alarm only indicates that a leak or low pressure is present in one of the tank of the system, but not which specific tank. Indicating the specific tank 102 saves maintenance time and resources because the user can address the specific tank 102 in need of attention rather than having to manually check all of the tanks 102 in the system.

In embodiments where the cloud platform 320 provides the status information to a user, the cloud platform 320 may facilitate providing information to multiple users, regardless of the user's location. By way of example, the cloud platform 320 may provide information regarding the status of the fire suppression system 100 to experts in a remote location. These experts may evaluate the information to determine if a fault is present. The experts may then dispatch service personnel to address issues with the fire suppression system 100. The monitoring system 200 may facilitate detection and correction of faults prior to the fire suppression system 100 experiencing downtime. Use of the cloud platform 320 may facilitate one expert evaluating the status of fire suppression systems 100 in multiple locations, reducing the need for additional personnel. By way of another example, the cloud platform 320 may provide information to a facility manager that is associated with a single facility.

FIG. 6 illustrates an exemplary GUI provided by the display 272 of the electronic gauge 202. As shown, the GUI provides text or icons indicating: the alert status of the electronic gauge 202 (e.g., requesting the user to check the status of a system); the signal strength of the connection between the electronic gauge 202 and the local network devices; the current date and time; the current charge level of the power source 260; the current sensed pressure; the current sensed temperature; and an indication of whether or not the normalized pressure is within a normal range.

Figure 20:
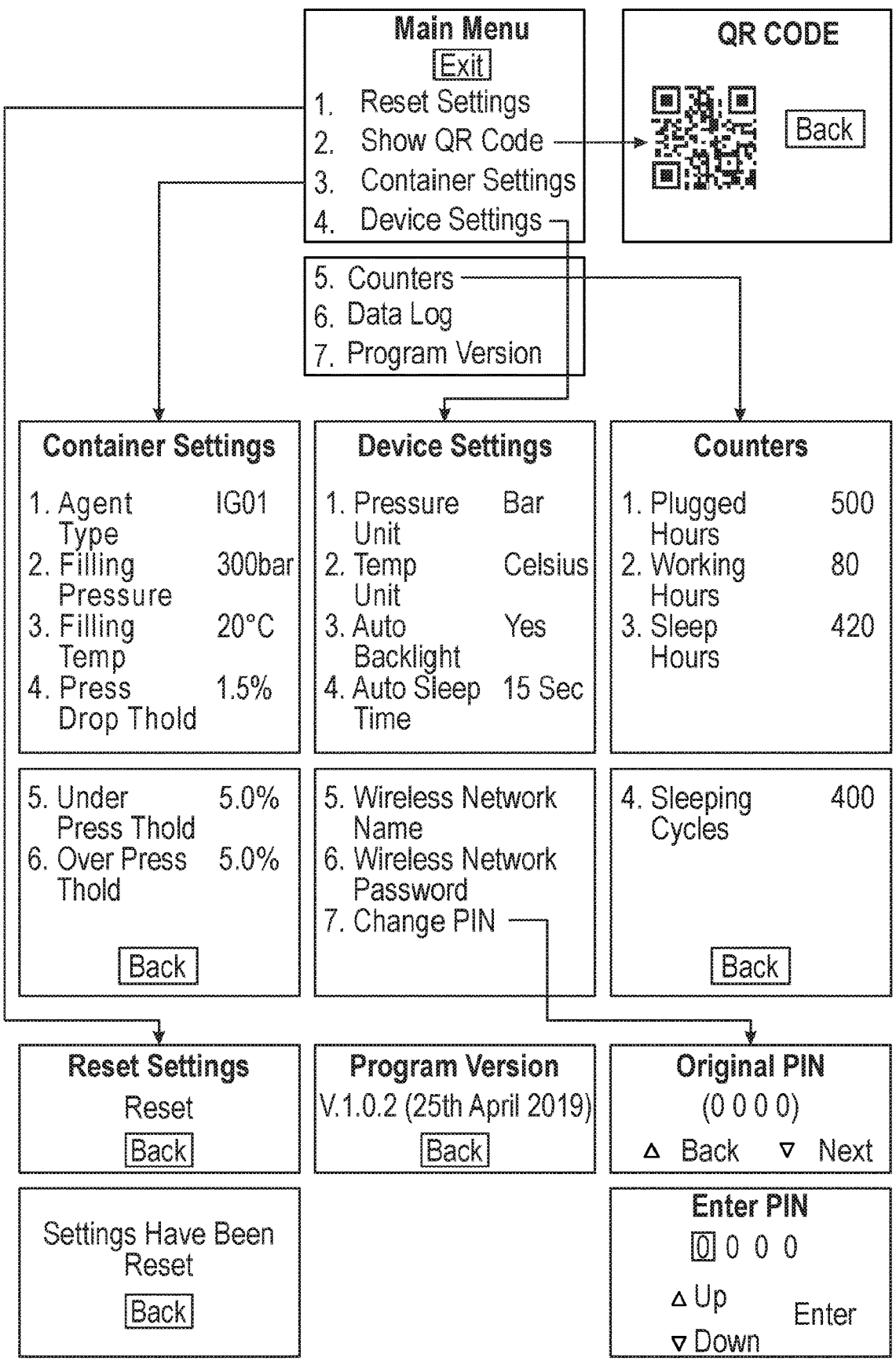
FIG. 20 illustrates graphical user interfaces of a menu system for a display of the sensor unit of FIG. 3.

FIG. 20 illustrates a series of exemplary GUI's that are provided by the display 272 of the electronic gauge 202. A user can navigate through the various GUI's (e.g., using the buttons 274) to access various information and settings. In a first menu, a user can view a QR code corresponding to the electronic gauge 202. Using a camera-enabled device (e.g., a smartphone), a user can scan the QR code to identify the electronic gauge 202 and facilitate connecting the electronic gauge 202 to the cloud platform 320. In a second menu, a user can view and/or edit current settings for: the type of agent in the tank 102, the desired filling pressure of the agent; the temperature at which the agent was filled; and pressure thresholds for various warnings. In a third menu, a user can view and/or edit: the units of pressure used by the electronic gauge 202; the units of temperature used by the electronic gauge 202; backlight settings; wireless network settings; and a PIN that is required to access the settings of the electronic gauge 202. In a fourth menu, a user can reset the electronic gauge 202 to factory settings. In a fifth menu, a user can view the current software version running on the electronic gauge 202. In a sixth menu, a user can view various statistics regarding the total hours of operation of the electronic gauge 202.

Power Management

Referring to FIG. 2, the electronic gauge 202 may be configured to minimize power consumption and thereby increase the operating time between recharges (e.g., replacing or recharging batteries). In some embodiments, the radio controller 250 is configured to selectively operate in a low power, sleep, or stop mode of operation. In the stop mode, certain functionalities of the electronic gauge 202 are disabled, reducing the power consumption of the electronic gauge 202. In some embodiments, the radio controller 250 disables all functionality of the electronic gauge 202 except for the volatile memory portions of the memory 254 that require power to maintain data (e.g., RAM) and a clock or timing functionality of the processor 252 that monitors the passage of time. By way of example, the radio controller 250 may disconnect the temperature sensor 240, the pressure sensor 242, and the display 272 from the power source 260 (e.g., using a switch, such as the TPS2286 analog switch produced by Texas Instruments, while in the stop mode.

In some embodiments, the radio controller 250 is an ultra-low power consumption controller (e.g., a 32-bit MCU ARM-based Cortex-M3 microcontroller, etc.) that consumes approximately 1.5 µA of current when in the stop mode. In some embodiments, a DC to DC voltage converter is electrically coupled to the radio controller 250 and the power source 260 and configured to boost the voltage supplied to the radio controller 250 from the power source 260. When operating in the stop mode, the voltage converter may be reconfigured to pass through the electrical energy from the power source 260 to the radio controller 250 without boosting the voltage, reducing the energy consumption of the voltage converter (e.g., by 200 nA).

The stop mode may be disabled by an external input, reconfiguring the electronic gauge into a wake mode. By way of example, a user may provide an external input (e.g., a wake command) through the buttons 274 that wakes the electronic gauge 202 from the stop mode. By way of another example, the stop mode may be disabled in response to receiving an external input (e.g., a wake command) from another device (e.g., over the network 284).

The stop mode may be disabled periodically by the radio controller 250. By way of example, the processor 252 may include clock functionality that monitors the passage of time. The processor 252 may be configured to provide a wake command to wake the electronic gauge 202 from the stop mode every time a wake period has passed. The wake period may be preset or specified by a user. By way of example, the wake period may be 15 minutes, 30 minutes, 45 minutes, 1 hour, 2 hours, etc.

In the wake mode, the electronic gauge 202 may activate the display 272, record sensor data, send data to another device, or perform another function. After performing this function (e.g., immediately after, after a time period has expired since completing the function), the electronic gauge 202 may automatically return to the stop mode. The type of action performed by the electronic gauge 202 in the wake mode may vary based upon the circumstance that caused the wake command. By way of example, in response to receiving a wake command through the buttons 274, the radio controller 250 may activate the display 272 to provide information to a user.

In some embodiments, in response to the wake period expiring, the radio controller 250 is configured to command the pressure sensor 242 and the temperature sensor 240 to record pressure and temperature data and to check the battery capacity of the power source 260. If the temperature, the pressure, or the battery capacity has changed more than a threshold amount since the previous recording, the radio controller 250 may transfer the temperature data, the pressure data, and the battery capacity data to the cloud platform 320. If the temperature, the pressure, or the battery capacity has not changed more than the threshold amount since the previous recording, the radio controller 250 may not send the temperature data, the pressure data, and the battery capacity data to the cloud platform 320. This saves energy if the data to be transferred does not indicate an important or unexpected condition. In some embodiments, the radio controller 250 transfers the temperature data, the pressure data, and the battery capacity data at least once per a maximum transmission delay period, regardless of the change in temperature, pressure, or battery capacity. In one embodiment, the maximum transmission delay period is two hours.

In some embodiments, the electronic gauge 202 permits a user to vary the wake period and/or the maximum transmission delay period to vary the battery life of the electronic gauge 202. In some embodiments, the radio controller 250 and/or the cloud platform 320 are configured to estimate the battery life based on the settings selected by the user and provide the estimated battery life to the user. This may facilitate a user making a selection that balances the need for rapid identification of fault conditions with the desire for maximized battery life. If the user selects the wake period and/or the maximum transmission delay period using the cloud platform 320, the cloud platform 320 may provide the settings to the electronic gauge 202 (e.g., over the network 284) to reconfigure the radio controller 250.

According to an exemplary embodiment, the power source 260 has a 3,500 mAh capacity. In this embodiment, the electronic gauge 202 is configured to consume approximately: 5 µAh in the stop mode; 35.4 µAh to transmit data (e.g., assuming a transmission occurs once every 2 hours); 52.7 µAh to perform sensor readings (e.g., assuming a reading occurs once every 30 minutes); and 4.8 µAh to operate the display 272 (e.g., assuming the screen 272 is used 24 times per year and for two minutes each session), for a total battery life of approximately 4 years.

In some embodiments, the electronic gauge 202 is configured to notify a user (e.g., through the display 272, through the cloud platform 320, etc.) when the power source 260 should be changed or recharged. This notification may come at a predetermined time (e.g., two years after the power source 260 was last changed). This notification may be provided when the power source 260 is depleted beyond a predetermined battery capacity. The electronic gauge 202 may additionally or alternatively provide the current battery capacity to the user (e.g., through the display 272) and/or to the cloud platform 320. The radio controller 250 may determine the current battery capacity using the voltage of the batteries and the discharge temperature (e.g., using a predetermined formula). Lithium ion batteries typically have a voltage curve that is relatively flat until the battery reaches 20% capacity (i.e., 80% of the battery capacity has been depleted), after which the voltage drops off sharply. In some embodiments, the radio controller 250 provides the notification when the capacity reaches 20% capacity.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Additionally, any element disclosed in one embodiment may be incorporated or utilized with any other embodiment disclosed herein.

What is claimed is:

1. A sensor unit for a fire suppression system, comprising:
    a sensor module comprising:
        a first housing including a shoulder and a fitting configured to be coupled to a tank containing a fluid;
        a pressure sensor located within the first housing and configured to sense a pressure of the fluid and provide pressure data related to the pressure of the fluid; and
        a temperature sensor located within the first housing and configured to sense a temperature and provide temperature data related to the temperature of the fluid;
    a display module comprising:
        a second housing selectively attached to the first housing such that the display module is selectively removable from the sensor module, the second housing including a connector boss having a threaded exterior; and
        a user interface configured to display the pressure data to a user;
    a nut rotatably coupled to the first housing and configured to engage the shoulder of the first housing, wherein the nut is threaded onto the threaded exterior of the connector boss and engages the shoulder to secure the attachment between the sensor module and the display module;
    an antenna configured to wirelessly transfer data; and
    a controller operatively coupled to the pressure sensor and the temperature sensor and configured to transfer the pressure data and the temperature data to a network through the antenna.

2. The sensor unit of claim 1, wherein the controller and the antenna are located within the second housing.

3. The sensor unit of claim 2, wherein the display module further comprises a local power storage device located within the second housing and electrically coupled to the controller and the user interface.

4. The sensor unit of claim 3, wherein the local power storage device comprises a plurality of batteries.

5. The sensor unit of claim 4, wherein the second housing includes a battery door that is selectively repositionable to provide access to the batteries.

6. The sensor unit of claim 5, wherein the antenna is a flexible antenna.

7. The sensor unit of claim 6, further comprising a LoRa module coupled to the antenna for communicating using the LoRa wireless protocol.

8. The sensor unit of claim 1, wherein the sensor module includes a first connector and the display module includes a second connector; and wherein with the sensor module attached to the display module, the first connector and second connector engage one another to allow the transfer of power and data between the sensor module and the display module.

9. The sensor unit of claim 8, wherein the first connector is a female connector and the second connector is a male connector.

10. The sensor unit of claim 8, wherein the second connector is positioned within the connector boss of the second housing.

11. The sensor unit of claim 1, further comprising:
a battery coupled to the second housing and configured to provide electrical energy;
wherein, in a sleep mode, the controller is configured to disable the pressure sensor, the antenna, and the user interface such that the pressure data is not sensed by the pressure sensor, transferred by the antenna, or displayed by the user interface; and
wherein, in a wake mode, the controller is configured to at least one of (a) control the pressure sensor to sense the pressure of the fluid, (b) transfer the pressure data using the antenna, and (c) control the user interface to display the pressure data.

12. The sensor unit of claim 11, wherein, in the wake mode, the controller is configured to control the user interface to display the pressure data, and wherein the controller is configured to enter the wake mode in response to receiving an input from the user through the user interface.

13. The sensor unit of claim 11, wherein the controller is configured to enter the wake mode in response to having been within the sleep mode for greater than a first predetermined time period, wherein, in the wake mode, the controller is configured to control the pressure sensor to sense the pressure of the fluid and provide the pressure data, and wherein the controller is configured to return to the sleep mode after the pressure of the fluid is sensed.

14. The sensor unit of claim 13, wherein the controller is configured to determine a difference between the pressure sensed in the wake mode and a previous pressure that was previously sensed by the pressure sensor;
wherein, in the wake mode, the controller is configured to transfer the pressure data using the antenna if the difference is greater than a threshold pressure difference; and
wherein the controller is configured to transfer the pressure data using the antenna at least once per a second predetermined time period, and wherein the second predetermined time period is greater than the first predetermined time period.

15. The sensor unit of claim 1, wherein the shoulder is received within the nut when the nut is threaded onto the threaded exterior of the connector boss.

16. The sensor unit of claim 1, wherein the nut is movable along a length of the first housing when the display module is removed from the sensor module.

17. A fire suppression system, comprising:
a plurality of storage tanks, each storage tank configured to store a pressurized fluid;
a plurality of sensor units, each sensor unit coupled to one of the storage tanks and each sensor unit comprising:
a sensor module comprising:
a first housing including a shoulder and a fitting configured to be coupled to the one of the storage tanks;
a pressure sensor located within the first housing and configured to sense a pressure of the pressurized fluid and provide pressure data related to the pressure of the pressurized fluid; and
a temperature sensor located within the first housing and configured to sense a temperature and provide temperature data related to the temperature of the pressurized fluid;
a display module comprising:
a second housing selectively attached to the first housing such that the display module is selectively removable from the sensor module, the second housing including a connector boss having a threaded exterior; and
a user interface configured to display the pressure data to a user;
a nut rotatably coupled to the first housing and configured to engage the shoulder of the first housing, wherein the nut is threaded onto the threaded exterior of the connector boss and engages the shoulder to secure the attachment between the sensor module and the display module;
an antenna configured to wirelessly transfer data; and
a controller operatively coupled to the pressure sensor and the temperature sensor and configured to transfer the pressure data and the temperature data through the antenna; and
a cloud-based computing system configured to receive the transferred pressure data and the temperature data from the plurality of sensor units, wherein the cloud-based computing system is programmed to:
store the transferred pressure data and temperature data;
calculate a normalized pressure for each of the plurality of storage tanks based on the pressure data and temperature data for that storage tank;
determine if the normalized pressure for each of the plurality of storage tanks indicates fluid leakage from that storage tank; and
generate a notification of a leak in one of the plurality of storage tanks when the determination indicates fluid leakage from that storage tank.

18. The fire suppression system of claim 17, wherein the cloud-based computing system is programmed to determine if the normalized pressure for one of the plurality of storage tanks indicates fluid leakage from that storage tank by comparing the normalized pressure to a threshold normalized pressure.

19. The fire suppression system of claim 17, wherein the cloud-based computing system is programmed to determine if the normalized pressure for one of the plurality of storage tanks indicates fluid leakage from that storage tank by comparing a rate of change of the normalized pressure to a threshold rate of change of normalized pressure.

20. A sensor unit for a fire suppression system, comprising:
a sensor module comprising:
a first housing including a shoulder and a fitting configured to be coupled to a tank containing a fluid;

at least one of a temperature sensor or a pressure sensor located within the first housing and configured to provide sensor data related to the fluid; and
a first connector coupled to the first housing;
a display module comprising:
   a second housing selectively attached to the first housing such that the display module is selectively removable from the sensor module, the second housing including a connector boss having a threaded exterior;
   a second connector positioned within the connector boss and configured to engage the first connector; and
   a user interface configured to display the sensor data to a user;
a nut rotatably coupled to the first housing and configured to translate relative to the shoulder of the first housing, wherein the nut is configured to engage the threaded exterior of the connector boss and the shoulder to secure the attachment between the sensor module and the display module, and wherein the shoulder is received within the nut when the nut secures the attachment between the sensor module and the display module;
an antenna configured to wirelessly transfer data; and
a controller operatively coupled to the sensor module and configured to transfer the sensor data to a network through the antenna.

* * * * *